(12) United States Patent
Carpenter et al.

(10) Patent No.: US 10,484,884 B2
(45) Date of Patent: *Nov. 19, 2019

(54) METHOD AND SYSTEM FOR IMPLEMENTING SELF ORGANIZING MOBILE NETWORK (SOMNET) OF DRONES

(71) Applicant: CenturyLink Intellectual Property LLC, Broomfield, CO (US)

(72) Inventors: Phil Carpenter, Castle Rock, CO (US); Steven M. Casey, Littleton, CO (US); Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,890

(22) Filed: Apr. 29, 2019

(65) Prior Publication Data

US 2019/0261194 A1 Aug. 22, 2019

Related U.S. Application Data

(63) Continuation of application No. 15/840,165, filed on Dec. 13, 2017, now Pat. No. 10,292,055.
(Continued)

(51) Int. Cl.
| | |
|---|---|
| *H04W 16/26* | (2009.01) |
| *H04W 24/02* | (2009.01) |
| *H04W 24/10* | (2009.01) |
| *H04W 24/08* | (2009.01) |
| *H04W 8/00* | (2009.01) |

(Continued)

(52) U.S. Cl.
CPC .......... *H04W 16/26* (2013.01); *H04W 24/02* (2013.01); *H04W 8/005* (2013.01); *H04W 24/08* (2013.01); *H04W 24/10* (2013.01); *H04W 84/005* (2013.01); *H04W 84/18* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2013/0078945 | A1* | 3/2013 | Lavi ...................... | H04W 84/22 455/410 |
| 2015/0264626 | A1* | 9/2015 | Perdomo ............... | H04W 40/12 370/216 |

(Continued)

*Primary Examiner* — Mohammed Rachedine

(57) ABSTRACT

Novel tools and techniques are provided for implementing self-organizing mobile networks ("SOMNETs") of drones and platforms. In various embodiments, a computing system might receive first data from each of a plurality of vehicles; might receive second data from each of a plurality of platforms; might analyze the first data to determine a status of each vehicle; and might analyze the second data to determine a status of each platform. Based at least in part on the analyzed first and second data, the computing system might generate at least one of first control instructions to at least one first vehicle of the plurality of vehicles or second control instructions to at least one first platform of the plurality of platforms that respectively cause the at least one first vehicle to perform one or more first actions or cause the at least one first platform to perform one or more second actions.

20 Claims, 17 Drawing Sheets

Related U.S. Application Data

(60) Provisional application No. 62/533,853, filed on Jul. 18, 2017.

(51) Int. Cl.
*H04W 84/18* (2009.01)
*H04W 88/08* (2009.01)
*H04W 84/00* (2009.01)

(56) References Cited

U.S. PATENT DOCUMENTS

| | | |
|---|---|---|
| 2016/0288744 A1* | 10/2016 | Rutherford ............... B60L 1/00 |
| 2017/0197518 A1* | 7/2017 | Myers ....................... B60L 7/10 |
| 2017/0339510 A1 | 11/2017 | Condeixa |
| 2017/0357263 A1* | 12/2017 | Glatfelter ............. G05D 1/0212 |
| 2019/0028903 A1 | 1/2019 | Carpenter et al. |
| 2019/0028904 A1 | 1/2019 | Carpenter et al. |

* cited by examiner

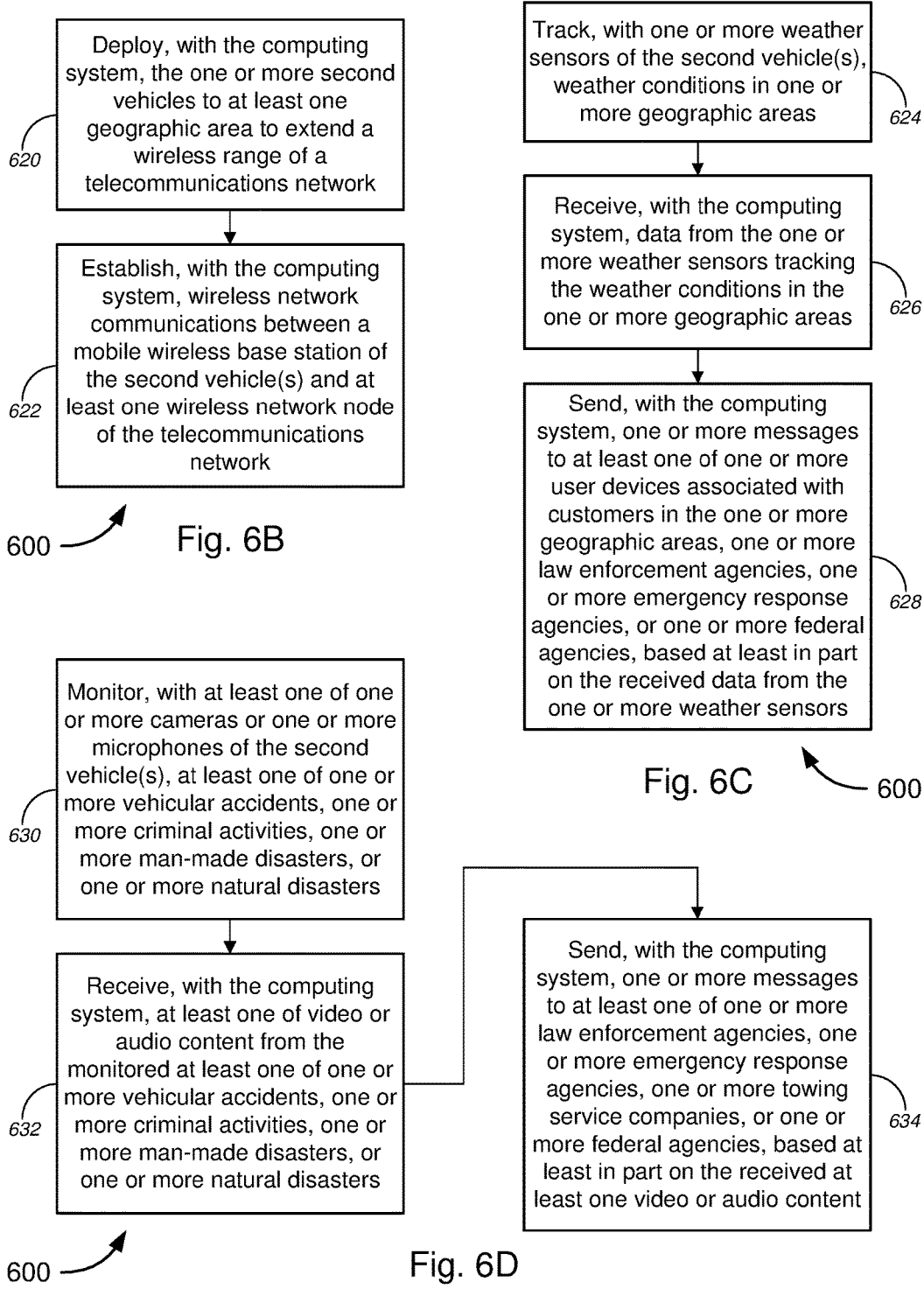

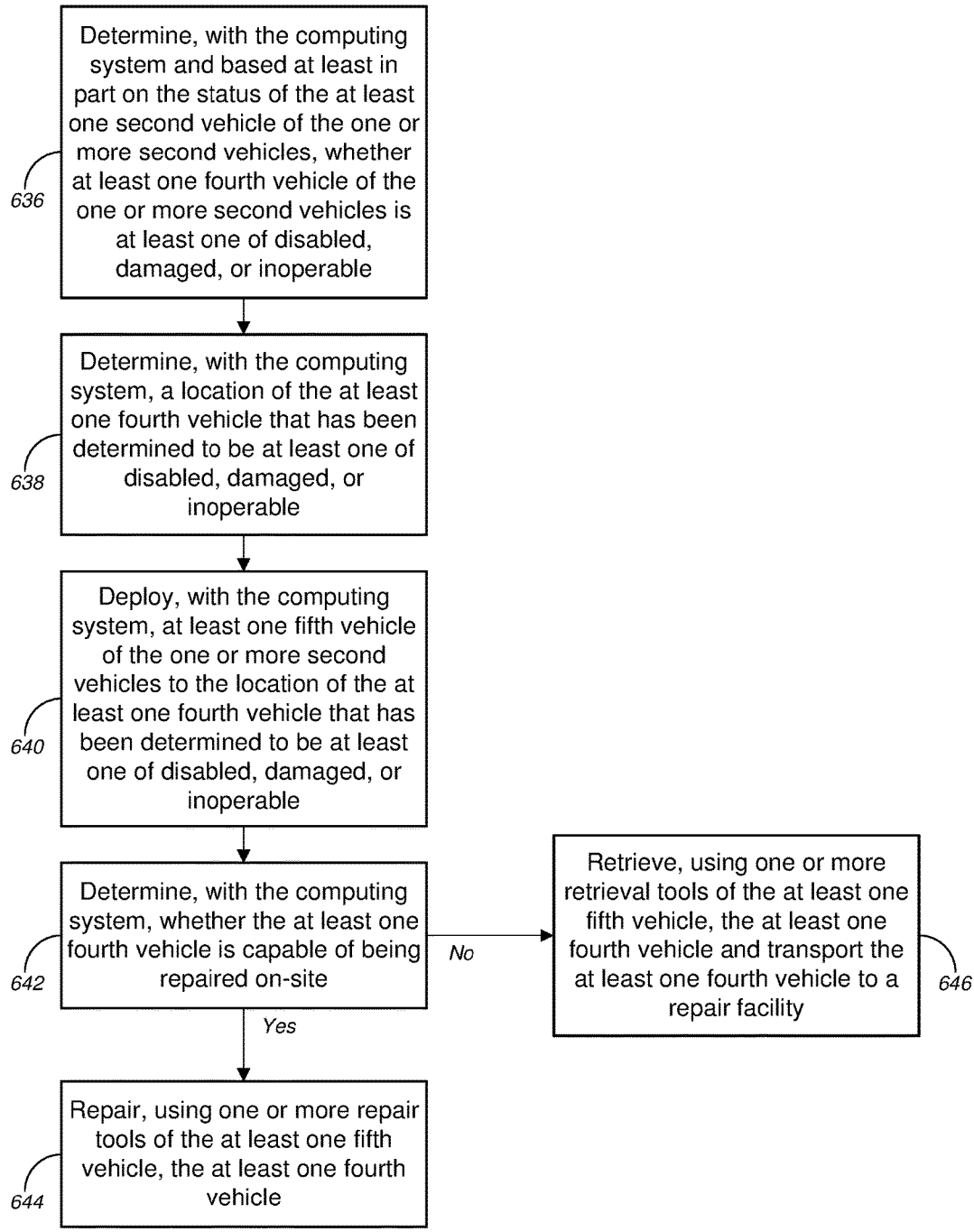
Fig. 6E  ⬉ 600

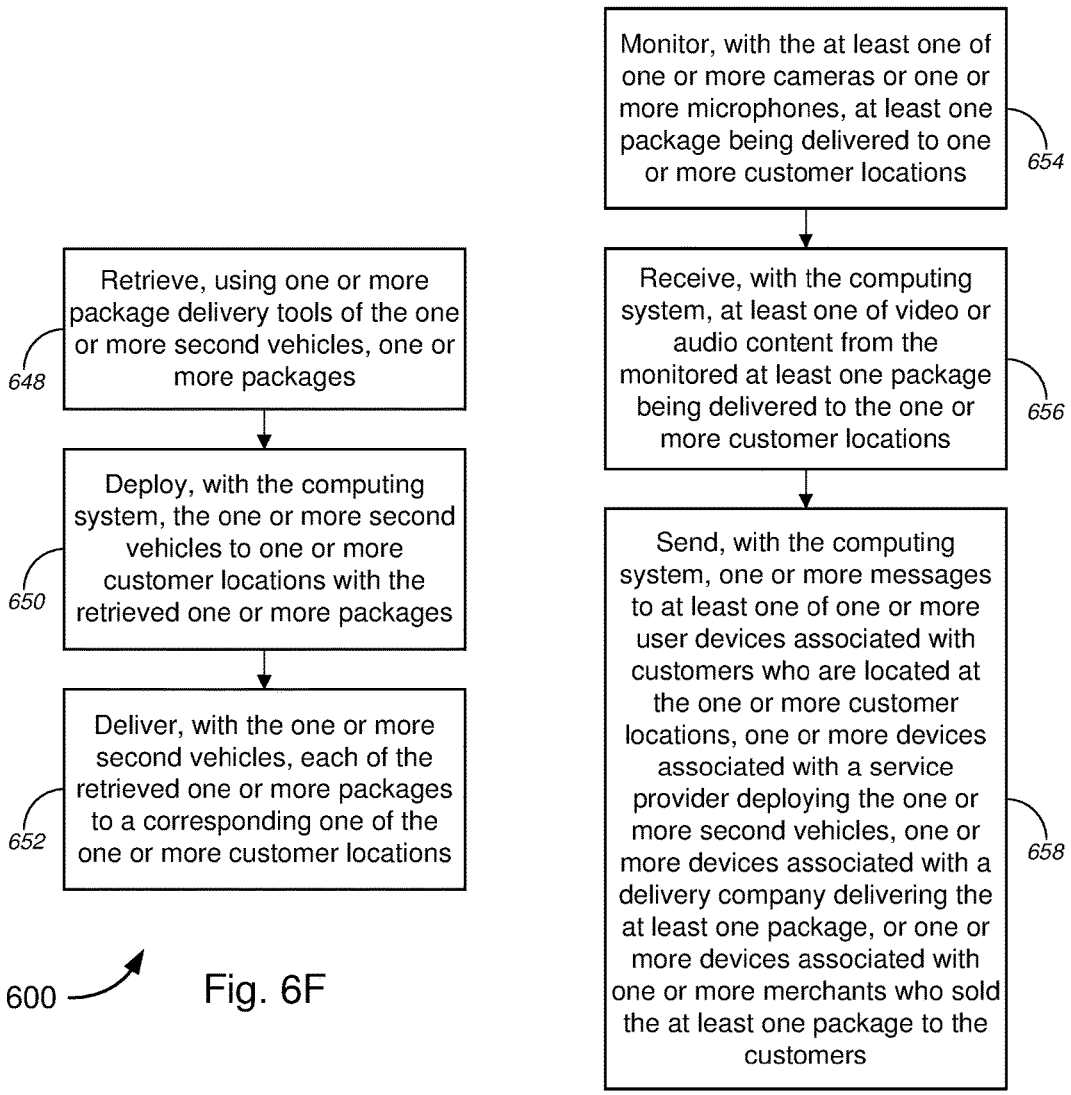

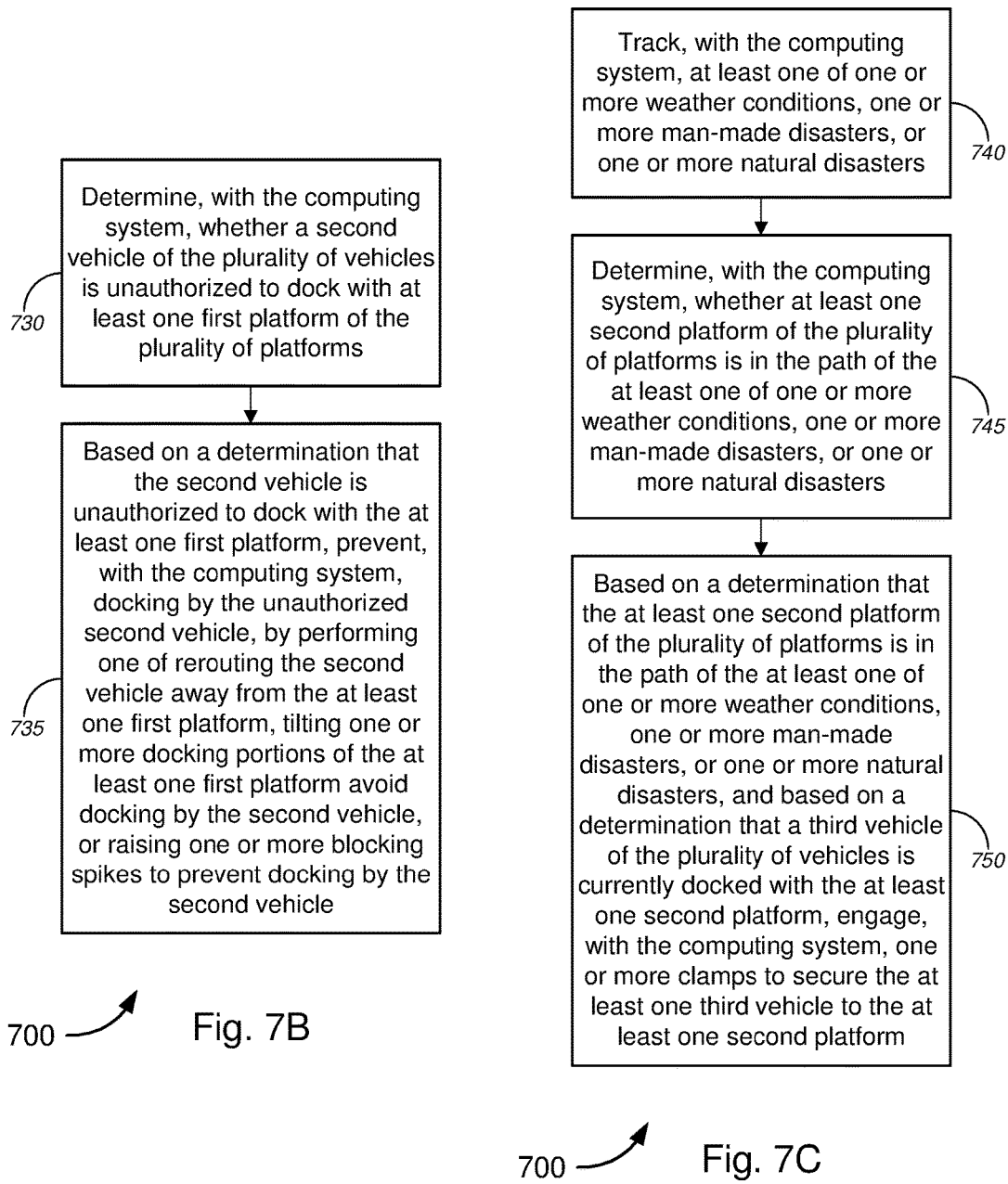

METHOD AND SYSTEM FOR IMPLEMENTING SELF ORGANIZING MOBILE NETWORK (SOMNET) OF DRONES

CROSS-REFERENCES TO RELATED APPLICATIONS

This application is a continuation application of U.S. patent application Ser. No. 15/840,165 (the "'165 Application"), filed on Dec. 13, 2019 by Phil Carpenter et al., entitled, "Method and System for Implementing Self Organizing Mobile Network (Somnet) of Drones," which claims priority to U.S. Patent Application Ser. No. 62/533,853 (the "'853 Application"), filed on Jul. 18, 2017 by Phil Carpenter, entitled, "Drone Charging Station on Poles," the disclosure of which is incorporated herein by reference in its entirety for all purposes.

This application may be related to U.S. patent application Ser. No. 15/840,265 (the "'265 Application"), filed concurrent herewith by Phil Carpenter et al., entitled, "Method and System for Implementing Self-Organizing Mobile Network (SOMNET) of Drones and Platforms," which claims priority to the '853 Applications, the disclosure of each of which is incorporated herein by reference in their entirety for all purposes. This application may also be related to U.S. patent application Ser. No. 15/810,523 (the "'523 Application"), filed on Nov. 13, 2017 by Pasha G. Mohammed et al., entitled, "Method and System for Implementing Ad Hoc Wireless Capacity Modification," which claims priority to U.S. Patent Application Ser. No. 62/452,727 (the "'727 Application"), filed Jan. 31, 2017 by Pasha G. Mohammed et al., entitled, "Adhoc Wireless Capacity Addition System," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing wireless communications and self-organizing networks ("SONs"), and, more particularly, to methods, systems, and apparatuses for implementing self-organizing mobile networks ("SOMNETs") of drones and platforms.

BACKGROUND

In conventional telecommunications systems, self-organizing networks ("SONs") may be implemented. However, existing SONs consist of stationary or non-mobile nodes, thus resulting in gaps in SON coverage if and when one or more nodes become disabled, damaged, or inoperable. To fix such gaps, technicians must perform truck rolls to diagnose and to repair or replace the disabled, damaged, or inoperable node(s), in some cases, over less than ideal terrain. Such truck rolls are time consuming and require cost and resources. Further, such conventional SONs are also inflexible in terms of functionality and feature sets as compared with the embodiments described herein.

Hence, there is a need for more robust and scalable solutions for implementing wireless communications and self-organizing networks ("SONs"), and, more particularly, to methods, systems, and apparatuses for implementing self-organizing mobile networks ("SOMNETs") of drones and platforms.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 6A-6H are flow diagrams illustrating a method for implementing SOMNETs of drones, in accordance with various embodiments.

FIGS. 7A-7D are flow diagrams illustrating a method for implementing SOMNETs of drones and platforms, in accordance with various embodiments.

DETAILED DESCRIPTION OF CERTAIN EMBODIMENTS

Overview

Figure 1:
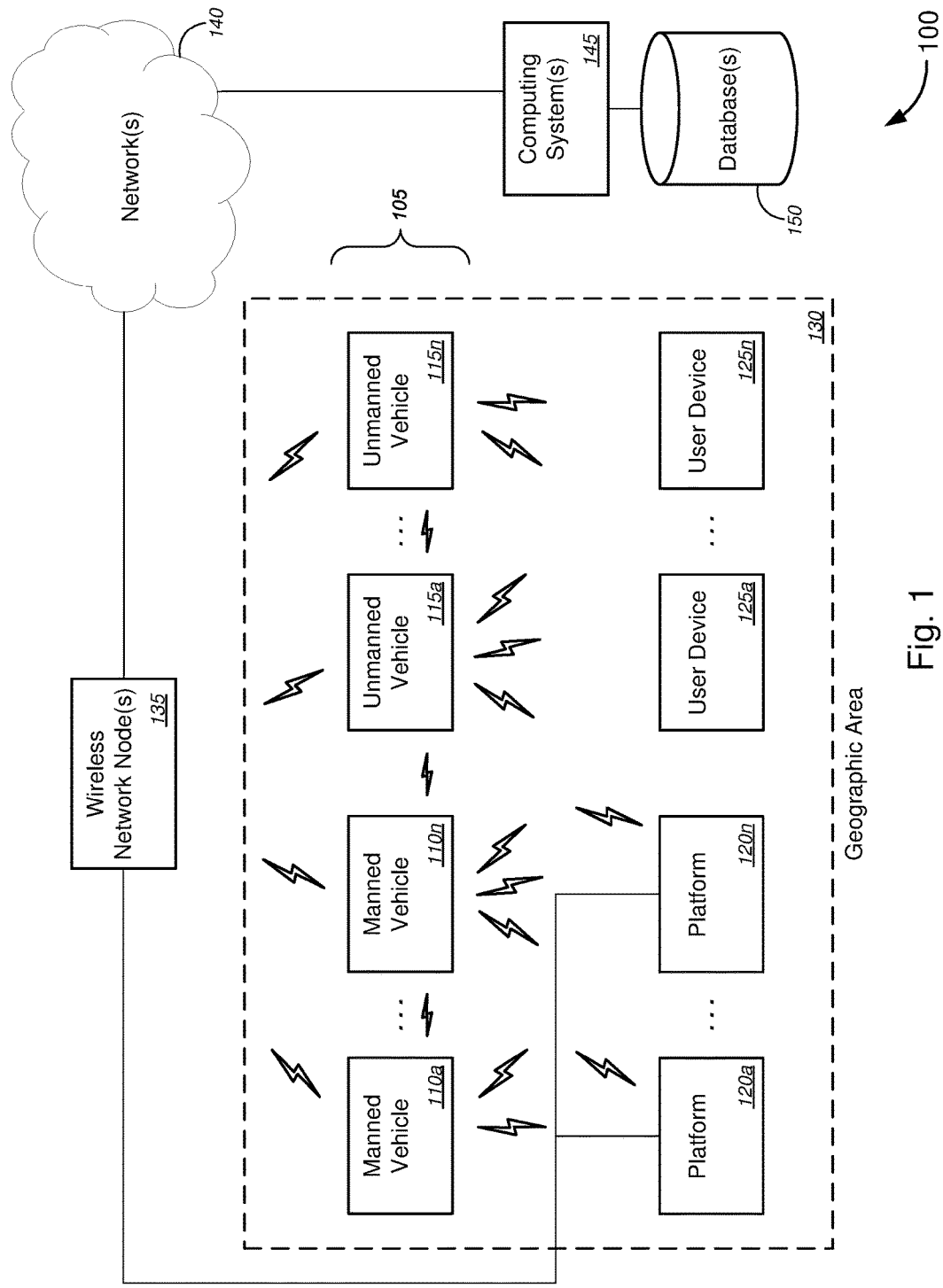
FIG. 1 is a schematic diagram illustrating a system for implementing self-organizing mobile networks ("SOMNETs") of drones and platforms, in accordance with various embodiments.

Various embodiments provide tools and techniques for implementing wireless communications and self-organizing networks ("SONs"), and, more particularly, to methods, systems, and apparatuses for implementing self-organizing mobile networks ("SOMNETs") of drones and platforms.

In various embodiments, a computing system might receive one or more requests for one of a plurality of vehicles to perform one or more tasks; might receive at least one first data from at least one first vehicle of the plurality of vehicles, the at least one first data comprising data regarding one or more second vehicles of the plurality of vehicles of a self-organizing mobile network ("SOMNET") of vehicles; and might analyze the at least one first data to determine a status of at least one second vehicle of the one or more second vehicles. In response to receiving the one or more requests and based at least in part on a determination that the at least one second vehicle is capable of performing at least one task of the one or more tasks, the computing system might generate one or more first control instructions and might send the one or more first control instructions to the at least one second vehicle, the one or more first control instructions causing each of the at least one second vehicle to perform one or more first actions. In response to receiving the one or more requests and based at least in part on a determination that the at least one second vehicle is unable to perform the at least one task of the one or more tasks, the computing system might identify at least one third vehicle of the one or more second vehicles that is capable of performing the at least one task of the one or more tasks and within a predetermined geographic range (e.g., within the geographic area), might generate one or more second control instructions, and might send the one or more second control instructions to the at least one third vehicle, the one or more second control instructions causing each of the at least one third vehicle to perform the one or more first actions.

In alternative embodiments, the computing system might receive at least one first data from each of a plurality of vehicles of a self-organizing mobile network ("SOMNET") of vehicles, the at least one first data comprising status data regarding each vehicle of the plurality of vehicles; might receive at least one second data from each of a plurality of platforms, the at least one second data comprising status data regarding each platform of the plurality of platforms; might analyze the at least one first data to determine a status of each of the plurality of vehicles; and might analyze the at least one second data to determine a status of each of the plurality of platforms. Based at least in part on the analyzed at least one first data and the analyzed at least one second data, the computing system might generate at least one of one or more first control instructions to at least one first vehicle of the plurality of vehicles or one or more second control instructions to at least one first platform of the plurality of platforms, the one or more first control instructions causing each of the at least one first vehicle to perform one or more first actions, and the one or more second control instructions causing each of the at least one first platform to perform one or more second actions.

In some embodiments, the computing system might include, without limitation, at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system, and/or the like. According to some embodiments, each of the plurality of vehicles might comprise one of a manned vehicle or an unmanned vehicle, and/or the like. Each manned vehicle might include, but is not limited to, one of a car, a motorcycle, an all-terrain vehicle, a truck, a van, a semi-trailer truck, an aircraft, a subterranean vehicle, an amphibious vehicle, or a water craft, and/or the like. Each unmanned vehicle might include, without limitation, one of an aerial drone, a land-based drone, a water-based drone, a subterranean drone, an amphibious drone, a robot, or an autonomous vehicle, and/or the like.

Each of the plurality of platforms might comprise one of a stationary platform or a mobile platform, and/or the like. Each stationary platform might include, but is not limited to, one of a telephone pole-based platform, a utility pole-based platform, a street-light based platform, a tower-based platform, a buoy-based platform, a hangar-based platform, a building-based platform, a roof-top-based platform, or a pedestal-based platform, and/or the like. Each mobile platform might include, without limitation, one of a cargo-trailer-based platform, a cargo-container-based platform, a van-based platform, a truck-based platform, an aircraft-based platform, a train-based platform, or a boat-based platform, and/or the like.

Merely by way of example, in some cases, the one or more first actions might include, but are not limited to, at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment, and/or the like.

In some instances, the one or more second actions might include, without limitation, at least one of controlling one or more vehicles of the plurality of vehicles to travel within a geographic area (e.g., to optimize communication, to gather sensor/monitoring data, etc.), controlling a vehicle of the plurality of vehicles to dock with one or more of the plurality of platforms, rerouting one or more vehicles of the plurality of vehicles along one or more alternative paths, rerouting one or more vehicles of the plurality of vehicles to avoid no-fly-zones, recharging a vehicle docked with one of the plurality of platforms, replacing at least one battery of a vehicle docked with one of the plurality of platforms with at least one replacement battery, installing at least one tool on a vehicle docked with one of the plurality of platforms, replacing at least one tool of a vehicle docked with one of the plurality of platforms with at least one replacement tool, repairing one of the plurality of vehicles docked with one of the plurality of platforms, preventing docking by unauthorized vehicles, remotely disabling one or more vehicles of the plurality of vehicles, pushing one or more software updates to one of the plurality of vehicles docked with one of the plurality of platforms, broadcasting platform resource information to one or more of the plurality of vehicles, establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, or tracking one or more packages being delivered, and/or the like.

The various embodiments provide a robust implementation that utilize a combination of mobile and stationary nodes in the SOMNET of vehicles/drones and/or platforms that enable improved flexibility in terms of functionality and feature sets, while reducing the amount of time, costs, and resources involved with truck rolls that would have been necessary should traditional SONs be used instead of the SOMNET of vehicles/drones and/or platforms.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, wireless communications technology, autonomous vehicle technology, and/or the like. In other aspects, certain embodiments can improve the functioning of user equipment or systems themselves (e.g., wireless user devices, wireless network systems, wireless communications networks, drones, drone platforms, etc.), for example, by analyzing, with a computing system, at least one first data received from at least one first vehicle of a plurality of vehicles to determine a status of at least one second vehicle of the plurality of vehicles; in response to receiving one or more requests for one of a plurality of vehicles to perform one or more tasks and based at least in part on a determination that the at least one second vehicle is capable of performing at least one task of the one or more tasks, generating, with the computing system, one or more first control instructions and sending, with the computing system, the one or more first control instructions to the at least one second vehicle, the one or more first control instructions causing each of the at least one second vehicle to perform one or more first actions; and in response to receiving the one or more requests for one of the plurality of vehicles to perform one or more tasks and based at least in part on a determination that the at least one second vehicle is unable to perform the at least one task of the one or more tasks, identifying, with the computing system, at least one third vehicle of the plurality of vehicles that is capable of performing the at least one task of the one or more tasks and that is within a predetermined geographic range, generating, with the computing system, one or more second control instructions, and sending, with the computing system, the one or more second control instructions to the at least one third vehicle, the one or more second control instructions causing each of the at least one third vehicle to perform the one or more first actions; and/or the like. In particular, to the extent any abstract concepts are present in the various embodiments, those concepts can be implemented as described herein by devices, software, systems, and methods that involve specific novel functionality (e.g., steps or operations), such as, deploying or sending first drones or other first vehicles to perform one or more first actions, and based on a determination that the first drones or other first vehicles are incapable of performing the one or more first actions, deploying or sending second drones or other second vehicles to perform the one or more first actions, and/or the like, to name a few examples, that extend beyond mere conventional computer processing operations. These functionalities can produce tangible results outside of the implementing computer system, including, merely by way of example, implementing a SOMNET of vehicles or drones performing one or more actions, and/or the like, at least some of which may be observed or measured by customers and/or service providers.

In alternative aspects, certain embodiments can improve the functioning of user equipment or systems themselves (e.g., wireless user devices, wireless network systems, wireless communications networks, drones, drone platforms, etc.), for example, by analyzing, with a computing system, at least one first data received from each of a plurality of vehicles to determine a status of each of the plurality of vehicles; analyzing, with the computing system, at least one second data received from each of a plurality of platforms to determine a status of each of the plurality of platforms; based at least in part on the analyzed at least one first data and the analyzed at least one second data, generating, with the computing system, at least one of one or more first control instructions to at least one first vehicle of the plurality of vehicles or one or more second control instructions to at least one first platform of the plurality of platforms, the one or more first control instructions causing each of the at least one first vehicle to perform one or more first actions, and the one or more second control instructions causing each of the at least one first platform to perform one or more second actions; and/or the like. In particular, to the extent any abstract concepts are present in the various embodiments, those concepts can be implemented as described herein by devices, software, systems, and methods that involve specific novel functionality (e.g., steps or operations), such as, deploying (or sending), or sending control instructions to, first drones or other first vehicles to perform one or more first actions, and/or sending control instructions to first platforms of a plurality of platforms, based at least in part on the analyzed at least one first data and the analyzed at least one second data, and/or the like, to name a few examples, that extend beyond mere conventional computer processing operations. These functionalities can produce tangible results outside of the implementing computer system, including, merely by way of example, implementing a SOMNET of vehicles/drones and platforms performing one or more actions, and/or the like, at least some of which may be observed or measured by customers and/or service providers.

In an aspect, a method might comprise receiving, with a computing system, one or more requests for one of a plurality of vehicles to perform one or more tasks; receiving, with the computing system, at least one first data from at least one first vehicle of the plurality of vehicles, the at least one first data comprising data regarding one or more second vehicles of the plurality of vehicles of a self-organizing mobile network ("SOMNET") of vehicles; and analyzing, with the computing system, the at least one first data to determine a status of at least one second vehicle of the one or more second vehicles. The method might also comprise, in response to receiving the one or more requests and based at least in part on a determination that the at least one second vehicle is capable of performing at least one task of the one or more tasks, generating, with the computing system, one or more first control instructions and sending, with the computing system, the one or more first control instructions to the at least one second vehicle, the one or more first control instructions causing each of the at least one second vehicle to perform one or more first actions. The method might further comprise, in response to receiving the one or more requests and based at least in part on a determination that the at least one second vehicle is unable to perform the at least one task of the one or more tasks, identifying, with the computing system, at least one third vehicle of the one or more second vehicles that is capable of performing the at least one task of the one or more tasks and that is within a predetermined geographic range, generating, with the computing system, one or more second control instructions, and sending, with the computing system, the one or more second control instructions to the at least one third vehicle, the one or more second control instructions causing each of the at least one third vehicle to perform the one or more first actions.

In some cases, the one or more second vehicles might comprise the first vehicle. According to some embodiments, the computing system might comprise at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system, and/or the like.

In some embodiments, each of the plurality of vehicles might comprise one of a manned vehicle or an unmanned vehicle, and/or the like. Each manned vehicle might comprise one of a car, a motorcycle, an all-terrain vehicle, a truck, a van, a semi-trailer truck, an aircraft, a subterranean vehicle, an amphibious vehicle, or a water craft, and/or the like. Each unmanned vehicle might comprise one of an aerial drone, a land-based drone, a water-based drone, a subterranean drone, an amphibious drone, a robot, or an autonomous vehicle, and/or the like. In some instances, at least one vehicle of the plurality of vehicles might comprise an inductive charging system that charges via inductive power transfer from one or more charging pads in a corresponding charging platform.

According to some embodiments, the determined status of the at least one second vehicle might comprise one of current battery charge level, remaining battery charge level, current geographic location, one or more currently plotted destinations, one or more currently plotted courses, proximity to one or more charging platforms, proximity to one or more communications platforms, proximity to one or more nearby vehicles, communications status with one or more nearby vehicles, new device status within the SOMNET, registration status within the SOMNET, availability to perform at least one of the one or more tasks, status of current task, status of one or more onboard tools, device failure status, disabled device status, or out-of-range device status, and/or the like.

In some embodiments, the at least one first vehicle might receive beacon data from each of at least one second vehicle of the one or more second vehicles. The data regarding the one or more second vehicles, in some cases, might comprise the beacon data from each of the at least one second vehicle. In some instances, the beacon data from each of the at least one second vehicle might comprise at least one of a unique identifier assigned to a particular one of the at least one second vehicle, signal strength of the beacon data, current battery level of the at least one second vehicle, remaining battery level of the at least one second vehicle, geographic location information of the particular one of the at least one second vehicle, relative location information of the particular one of the at least one second vehicle with respect to other vehicles, communication transmit power level, or configuration parameters, and/or the like.

Merely by way of example, in some cases, the one or more first actions might comprise at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment, and/or the like.

According to some embodiments, the one or more second vehicles might each comprise at least one of a vehicle or a drone, and each of the one or more second vehicles might comprise a mobile wireless base station. In such cases, the method might further comprise deploying, with the computing system, the one or more second vehicles to at least one geographic area to extend a wireless range of a telecommunications network; and establishing, with the computing system, wireless network communications between the mobile wireless base station and at least one wireless network node of the telecommunications network.

In some embodiments, the one or more second vehicles might each comprise at least one of a vehicle or a drone, and each of the one or more second vehicles might comprise one or more weather sensors comprising at least one of one or more pressure sensors, one or more temperature sensors, one or more motion sensors, one or more solar light sensors, one or more ambient light sensors, one or more infra-red sensors, one or more ultra-violet sensors, one or more sound sensors, one or more seismic sensors, one or more air quality sensors, one or more moisture sensors, one or more wind sensors, or one or more particulate sensors, and/or the like. In such cases, the method might further comprise tracking, with the one or more weather sensors, weather conditions in one or more geographic areas; receiving, with the computing system, data from the one or more weather sensors tracking the weather conditions in the one or more geographic areas; and sending, with the computing system, one or more messages to at least one of one or more user devices associated with customers in the one or more geographic areas, one or more law enforcement agencies, one or more emergency response agencies, or one or more federal agencies, and/or the like, based at least in part on the received data from the one or more weather sensors.

According to some embodiments, the one or more second vehicles might each comprise at least one of a vehicle or a drone, and each of the one or more second vehicles might comprise at least one of one or more cameras or one or more microphones. In such cases, the method might further comprise monitoring, with the at least one of one or more cameras or one or more microphones, at least one of one or more vehicular accidents, one or more criminal activities, one or more man-made disasters, or one or more natural disasters, and/or the like; receiving, with the computing system, at least one of video or audio content from the monitored at least one of one or more vehicular accidents, one or more criminal activities, one or more man-made disasters, or one or more natural disasters, and/or the like; and sending, with the computing system, one or more messages to at least one of one or more law enforcement agencies, one or more emergency response agencies, one or more towing service companies, or one or more federal agencies, and/or the like, based at least in part on the received at least one video or audio content.

In some embodiments, the one or more second vehicles might each comprise at least one of a vehicle or a drone. The method might further comprise determining, with the computing system and based at least in part on the status of the at least one second vehicle of the one or more second vehicles, whether at least one fourth vehicle of the one or more second vehicles is at least one of disabled, damaged, or inoperable; determining, with the computing system, a location of the at least one fourth vehicle that has been determined to be at least one of disabled, damaged, or inoperable; deploying, with the computing system, at least one fifth vehicle of the one or more second vehicles to the location of the at least one fourth vehicle that has been determined to be at least one of disabled, damaged, or inoperable; determining, with the computing system, whether the at least one fourth vehicle is capable of being repaired on-site; based on a determination that the at least one fourth vehicle is capable of being repaired on-site, repairing, using one or more repair tools of the at least one fifth vehicle, the at least one fourth vehicle; and based on a determination that the at least one fourth vehicle is incapable of being repaired on-site, retrieving, using one or more retrieval tools of the at least one fifth vehicle, the at least one fourth vehicle and transporting the at least one fourth vehicle to a repair facility.

According to some embodiments, the one or more second vehicles might each comprise at least one of a vehicle or a drone. The method might further comprise retrieving, using one or more package delivery tools of the one or more second vehicles, one or more packages; deploying, with the computing system, the one or more second vehicles to one or more customer locations with the retrieved one or more packages, the one or more customer locations comprising at least one of one or more customer premises, one or more parked customer vehicles, one or more moving customer vehicles, one or more current locations of a user device associated with a recipient of at least one of the one or more packages, one or more anticipated locations of a user device associated with a recipient of at least one of the one or more packages, or one or more designated delivery locations, and/or the like; and delivering, with the one or more second vehicles, each of the retrieved one or more packages to a corresponding one of the one or more customer locations.

In some embodiments, the one or more second vehicles might each comprise at least one of a vehicle or a drone, and each of the one or more second vehicles might comprise at least one of one or more cameras or one or more microphones, and/or the like. In such cases, the method might further comprise monitoring, with the at least one of one or more cameras or one or more microphones, at least one package being delivered to one or more customer locations, the one or more customer locations comprising at least one of one or more customer premises, one or more parked customer vehicles, one or more moving customer vehicles, or one or more designated delivery locations, and/or the like; receiving, with the computing system, at least one of video or audio content from the monitored at least one package being delivered to the one or more customer locations; and sending, with the computing system, one or more messages to at least one of one or more user devices associated with customers who are located at the one or more customer locations, one or more devices associated with a service provider deploying the one or more second vehicles, one or more devices associated with a delivery company delivering the at least one package, or one or more devices associated with one or more merchants who sold the at least one package to the customers, and/or the like.

According to some embodiments, the one or more second vehicles might each comprise at least one of a vehicle or a drone. The method might further comprise determining, with the computing system, whether one or more telecommunications equipment within a geographic area are at least one of disabled, damaged, or inoperable; determining, with the computing system, a location of the one or more telecommunications equipment that have been determined to be at least one of disabled, damaged, or inoperable; deploying, with the computing system, at least one sixth vehicle of the one or more second vehicles to the location of each of the one or more telecommunications equipment that have been determined to be at least one of disabled, damaged, or inoperable; determining, with the computing system, whether the one or more telecommunications equipment are capable of being repaired on-site; based on a determination that at least one of the one or more telecommunications equipment are capable of being repaired on-site, repairing, using one or more repair tools of the at least one sixth vehicle, the at least one of the one or more telecommunications equipment that are capable of being repaired on-site; and based on a determination that at least one of the one or more telecommunications equipment are incapable of being repaired on-site, retrieving, using one or more retrieval tools of the at least one sixth vehicle, the at least one of the one or more telecommunications equipment that are incapable of being repaired on-site and transporting the at least one of the one or more telecommunications equipment to a repair facility.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive one or more requests for one of a plurality of vehicles to perform one or more tasks; receive at least one first data from at least one first vehicle of the plurality of vehicles, the at least one first data comprising data regarding one or more second vehicles of the plurality of vehicles of a self-organizing mobile network ("SOMNET") of vehicles; analyze the at least one first data to determine a status of at least one second vehicle of the one or more second vehicles; in response to receiving the one or more requests and based at least in part on a determination that the at least one second vehicle is capable of performing at least one task of the one or more tasks, generate one or more first control instructions and send the one or more first control instructions to the at least one second vehicle, the one or more first control instructions causing each of the at least one second vehicle to perform one or more first actions; and in response to receiving the one or more requests and based at least in part on a determination that the at least one second vehicle is unable to perform the at least one task of the one or more tasks, identify at least one third vehicle of the one or more second vehicles that is capable of performing the at least one task of the one or more tasks and within a predetermined geographic range, generate one or more second control instructions, and send the one or more second control instructions to the at least one third vehicle, the one or more second control instructions causing each of the at least one third vehicle to perform the one or more first actions.

In some embodiments, the apparatus might comprise at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system, and/or the like. In some cases, each of the plurality of vehicles might comprise one of a manned vehicle or an unmanned vehicle. Each manned vehicle might comprise one of a car, a motorcycle, an all-terrain vehicle, a truck, a van, a semi-trailer truck, an aircraft, a subterranean vehicle, an amphibious vehicle, or a water craft, and/or the like. Each unmanned vehicle might comprise one of an aerial drone, a land-based drone, a water-based drone, a subterranean drone, an amphibious drone, a robot, or an autonomous vehicle, and/or the like.

According to some embodiments, the determined status of the at least one second vehicle might comprise one of current battery charge level, remaining battery charge level, current geographic location, one or more currently plotted destinations, one or more currently plotted courses, proximity to one or more charging platforms, proximity to one or more communications platforms, proximity to one or more nearby vehicles, communications status with one or more nearby vehicles, new device status within the SOMNET, registration status within the SOMNET, availability to perform at least one of the one or more tasks, status of current task, status of one or more onboard tools, device failure status, disabled device status, or out-of-range device status, and/or the like.

In some embodiments, the one or more first actions might comprise at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment, and/or the like.

In yet another aspect, a system might comprise a computing system and a plurality of vehicles. The computing system comprising at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive one or more requests for one of a plurality of vehicles to perform one or more tasks; receive at least one first data from at least one first vehicle of the plurality of vehicles, the at least one first data comprising data regarding one or more second vehicles of the plurality of vehicles of a self-organizing mobile network ("SOMNET") of vehicles; analyze the at least one first data to determine a status of at least one second vehicle of the one or more second vehicles; in response to receiving the one or more requests and based at least in part on a determination that the at least one second vehicle is capable of performing at least one task of the one or more tasks, generate one or more first control instructions and send the one or more first control instructions to the at least one second vehicle, the one or more first control instructions causing each of the at least one second vehicle to perform one or more first actions; and in response to receiving the one or more requests and based at least in part on a determination that the at least one second vehicle is unable to perform the at least one task of the one or more tasks, identify at least one third vehicle of the one or more second vehicles that is capable of performing the at least one task of the one or more tasks and within a predetermined geographic range, generate one or more second control instructions, and send the one or more second control instructions to the at least one third vehicle, the one or more second control instructions causing each of the at least one third vehicle to perform the one or more first actions.

The at least one second vehicle and the at least one third vehicle might each comprise a propulsion system, at least one second processor, and a second non-transitory computer readable medium communicatively coupled to the at least one second processor, the second non-transitory computer readable medium having stored thereon computer software comprising a second set of instructions that, when executed by the at least one second processor, causes the vehicle to: receive one of the one or more first control instructions or the one or more second control instructions; and perform the one or more first actions, based at least in part on the received one of the one or more first control instructions or the one or more second control instructions.

In an alternative aspect, a method might comprise receiving, with a computing system, at least one first data from each of a plurality of vehicles of a self-organizing mobile network ("SOMNET") of vehicles, the at least one first data comprising status data regarding each vehicle of the plurality of vehicles; receiving, with the computing system, at least one second data from each of a plurality of platforms, the at least one second data comprising status data regarding each platform of the plurality of platforms; analyzing, with the computing system, the at least one first data to determine a status of each of the plurality of vehicles; and analyzing, with the computing system, the at least one second data to determine a status of each of the plurality of platforms. The method might further comprise, based at least in part on the analyzed at least one first data and the analyzed at least one second data, generating, with the computing system, at least one of one or more first control instructions to at least one first vehicle of the plurality of vehicles or one or more second control instructions to at least one first platform of the plurality of platforms, the one or more first control instructions causing each of the at least one first vehicle to perform one or more first actions, and the one or more second control instructions causing each of the at least one first platform to perform one or more second actions.

According to some embodiments, the computing system might comprise at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system, and/or the like.

In some embodiments, each of the plurality of vehicles might comprise one of a manned vehicle or an unmanned vehicle. Each manned vehicle might comprise one of a car, a motorcycle, an all-terrain vehicle, a truck, a van, a semi-trailer truck, an aircraft, a subterranean vehicle, an amphibious vehicle, or a water craft, and/or the like. Each unmanned vehicle might comprise one of an aerial drone, a land-based drone, a water-based drone, a subterranean drone, an amphibious drone, a robot, or an autonomous vehicle, and/or the like. In some cases, each of the plurality of platforms might comprise one of a stationary platform or a mobile platform. Each stationary platform might comprise one of a telephone pole-based platform, a utility pole-based platform, a street-light based platform, a tower-based platform, a buoy-based platform, a hangar-based platform, a building-based platform, a roof-top-based platform, or a pedestal-based platform, and/or the like. Each mobile platform might comprise one of a cargo-trailer-based platform, a cargo-container-based platform, a van-based platform, a truck-based platform, an aircraft-based platform, a train-based platform, or a boat-based platform, and/or the like. In some instances, at least one vehicle of the plurality of vehicles might comprise an inductive charging system that charges via inductive power transfer from one or more charging pads in a corresponding charging platform with which the at least one vehicle docks.

According to some embodiments, the determined status of the at least one second vehicle might comprise one of current battery charge level, remaining battery charge level, current geographic location, one or more currently plotted destinations, one or more currently plotted courses, proximity to one or more charging platforms, proximity to one or more communications platforms, proximity to one or more nearby vehicles, communications status with one or more nearby vehicles, new device status within the SOMNET, registration status within the SOMNET, availability to perform at least one of the one or more tasks, status of current task, status of one or more onboard tools, device failure status, disabled device status, or out-of-range device status, and/or the like.

In some embodiments, at least one second vehicle of the plurality of vehicles might each receive beacon data from at least one third vehicle of the plurality of vehicles. The data regarding the at least one third vehicle might comprise the beacon data from each of the at least one third vehicle. In some instances, the beacon data from each of the at least one third vehicle might comprise at least one of a unique identifier assigned to a particular one of the at least one third vehicle, signal strength of the beacon data, current battery level of the at least one third vehicle, remaining battery level of the at least one third vehicle, geographic location information of the particular one of the at least one third vehicle, relative location information of the particular one of the at least one third vehicle with respect to other vehicles, communication transmit power level, or configuration parameters, and/or the like.

According to some embodiments, the one or more first actions might comprise at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment, and/or the like.

In some embodiments, the one or more second actions might comprise at least one of controlling one or more vehicles of the plurality of vehicles to travel within a geographic area, controlling a vehicle of the plurality of vehicles to dock with one or more of the plurality of platforms, rerouting one or more vehicles of the plurality of vehicles along one or more alternative paths, rerouting one or more vehicles of the plurality of vehicles to avoid no-fly-zones, recharging a vehicle docked with one of the plurality of platforms, replacing at least one battery of a vehicle docked with one of the plurality of platforms with at least one replacement battery, installing at least one tool on a vehicle docked with one of the plurality of platforms, replacing at least one tool of a vehicle docked with one of the plurality of platforms with at least one replacement tool, repairing one of the plurality of vehicles docked with one of the plurality of platforms, preventing docking by unauthorized vehicles, remotely disabling one or more vehicles of the plurality of vehicles, pushing one or more software updates to one of the plurality of vehicles docked with one of the plurality of platforms, broadcasting platform resource information to one or more of the plurality of vehicles, establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, or tracking one or more packages being delivered, and/or the like. In some cases, the platform resource information might comprise at least one of resources available at a particular broadcasting platform, capabilities of a particular broadcasting platform, profiles of a particular broadcasting platform, rates of services provided by a particular broadcasting platform, or types of batteries available at a particular broadcasting platform, and/or the like.

According to some embodiments, the method might further comprise determining, with the computing system, whether a fourth vehicle of the plurality of vehicles is unauthorized to dock with at least one first platform of the plurality of platforms; and based on a determination that the fourth vehicle is unauthorized to dock with the at least one first platform, preventing, with the computing system, docking by the unauthorized fourth vehicle, by performing one of rerouting the fourth vehicle away from the at least one first platform, tilting one or more docking portions of the at least one first platform avoid docking by the fourth vehicle, or raising one or more blocking spikes or deploying one or more barriers to prevent docking by the fourth vehicle, and/or the like.

In some embodiments, the method might further comprise tracking, with the computing system, at least one of one or more weather conditions, one or more man-made disasters, or one or more natural disasters; determining, with the computing system, whether at least one second platform of the plurality of platforms is in the path of the at least one of one or more weather conditions, one or more man-made disasters, or one or more natural disasters; and based on a determination that the at least one second platform of the plurality of platforms is in the path of the at least one of one or more weather conditions, one or more man-made disasters, or one or more natural disasters, and based on a determination that a fifth vehicle of the plurality of vehicles is currently docked with the at least one second platform, engaging, with the computing system, one or more clamps to secure the at least one fifth vehicle to the at least one second platform, wherein the one or more clamps comprise at least one of one or more magnetic clamps, one or more electro-magnetic clamps, or one or more mechanical clamps, and/or the like.

According to some embodiments, the method might further comprise mapping, with the computing system, two or more sixth vehicles of the plurality of vehicles; mapping, with the computing system, two or more third platforms of the plurality of platforms; determining, with the computing system, the status of each of the two or more sixth vehicles, based at least in part on the at least one first data corresponding to each of the two or more sixth vehicles; determining, with the computing system, the status of each of the two or more third platforms, based at least in part on the at least one second data corresponding to each of the two or more third platforms; and coordinating, with the computing system, movement of at least one of the two or more sixth vehicles in relation to at least one of the two or more third platforms, based at least in part on the status of each of the two or more sixth vehicles and on the status of each of the two or more third platforms.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive at least one first data from each of a plurality of vehicles of a self-organizing mobile network ("SOMNET") of vehicles, the at least one first data comprising status data regarding each vehicle of the plurality of vehicles; receive at least one second data from each of a plurality of platforms, the at least one second data comprising status data regarding each platform of the plurality of platforms; analyze the at least one first data to determine a status of each of the plurality of vehicles; analyze the at least one second data to determine a status of each of the plurality of platforms; and based at least in part on the analyzed at least one first data and the analyzed at least one second data, generate at least one of one or more first control instructions to at least one first vehicle of the plurality of vehicles or one or more second control instructions to at least one first platform of the plurality of platforms, the one or more first control instructions causing each of the at least one first vehicle to perform one or more first actions, and the one or more second control instructions causing each of the at least one first platform to perform one or more second actions.

In some embodiments, the apparatus might comprise at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system, and/or the like.

According to some embodiments, each of the plurality of vehicles might comprise one of a manned vehicle or an unmanned vehicle. Each manned vehicle might comprise one of a car, a motorcycle, an all-terrain vehicle, a truck, a van, a semi-trailer truck, an aircraft, a subterranean vehicle, an amphibious vehicle, or a water craft, and/or the like. Each unmanned vehicle might comprise one of an aerial drone, a land-based drone, a water-based drone, a subterranean drone, an amphibious drone, a robot, or an autonomous vehicle, and/or the like. In some instances, each of the plurality of platforms might comprise one of a stationary platform or a mobile platform. Each stationary platform might comprise one of a telephone pole-based platform, a utility pole-based platform, a street-light based platform, a tower-based platform, a buoy-based platform, a hangar-based platform, a building-based platform, a roof-top-based platform, or a pedestal-based platform, and/or the like. Each mobile platform might comprise one of a cargo-trailer-based platform, a cargo-container-based platform, a van-based platform, a truck-based platform, an aircraft-based platform, a train-based platform, or a boat-based platform, and/or the like. In some cases, at least one vehicle of the plurality of vehicles might comprise an inductive charging system that charges via inductive power transfer from one or more charging pads in a corresponding charging platform with which the at least one vehicle docks.

In some embodiments, the determined status of the at least one second vehicle might comprise one of current battery charge level, remaining battery charge level, current geographic location, one or more currently plotted destinations, one or more currently plotted courses, proximity to one or more charging platforms, proximity to one or more communications platforms, proximity to one or more nearby vehicles, communications status with one or more nearby vehicles, new device status within the SOMNET, registration status within the SOMNET, availability to perform at least one of the one or more tasks, status of current task, status of one or more onboard tools, device failure status, disabled device status, or out-of-range device status, and/or the like.

According to some embodiments, at least one second vehicle of the plurality of vehicles might each receive beacon data from at least one third vehicle of the plurality of vehicles. The data regarding the at least one third vehicle might comprise the beacon data from each of the at least one third vehicle. In some cases, the beacon data from each of the at least one third vehicle might comprise at least one of a unique identifier assigned to a particular one of the at least one third vehicle, signal strength of the beacon data, current battery level of the at least one third vehicle, remaining battery level of the at least one third vehicle, geographic location information of the particular one of the at least one third vehicle, relative location information of the particular one of the at least one third vehicle with respect to other vehicles, communication transmit power level, or configuration parameters, and/or the like.

In some embodiments, the one or more first actions might comprise at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment, and/or the like.

According to some embodiments, the one or more second actions might comprise at least one of controlling one or more vehicles of the plurality of vehicles to travel within a geographic area, controlling a vehicle of the plurality of vehicles to dock with one or more of the plurality of platforms, rerouting one or more vehicles of the plurality of vehicles along one or more alternative paths, rerouting one or more vehicles of the plurality of vehicles to avoid no-fly-zones, recharging a vehicle docked with one of the plurality of platforms, replacing at least one battery of a vehicle docked with one of the plurality of platforms with at least one replacement battery, installing at least one tool on a vehicle docked with one of the plurality of platforms, replacing at least one tool of a vehicle docked with one of the plurality of platforms with at least one replacement tool, repairing one of the plurality of vehicles docked with one of the plurality of platforms, preventing docking by unauthorized vehicles, remotely disabling one or more vehicles of the plurality of vehicles, pushing one or more software updates to one of the plurality of vehicles docked with one of the plurality of platforms, broadcasting platform resource information to one or more of the plurality of vehicles, establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, or tracking one or more packages being delivered, and/or the like. In some embodiments, the platform resource information might comprise at least one of resources available at a particular broadcasting platform, capabilities of a particular broadcasting platform, profiles of a particular broadcasting platform, rates of services provided by a particular broadcasting platform, or types of batteries available at a particular broadcasting platform, and/or the like.

In some embodiments, the set of instructions, when executed by the at least one processor, might further cause the apparatus to: determine whether a fourth vehicle of the plurality of vehicles is unauthorized to dock with at least one first platform of the plurality of platforms; and based on a determination that the fourth vehicle is unauthorized to dock with the at least one first platform, prevent docking by the unauthorized fourth vehicle, by performing one of rerouting the fourth vehicle away from the at least one first platform, tilting one or more docking portions of the at least one first platform avoid docking by the fourth vehicle, or raising one or more blocking spikes or deploying one or more barriers to prevent docking by the fourth vehicle.

According to some embodiments, the set of instructions, when executed by the at least one processor, might further cause the apparatus to: track at least one of one or more weather conditions, one or more man-made disasters, or one or more natural disasters; determine whether at least one second platform of the plurality of platforms is in the path of the at least one of one or more weather conditions, one or more man-made disasters, or one or more natural disasters; and based on a determination that the at least one second platform of the plurality of platforms is in the path of the at least one of one or more weather conditions, one or more man-made disasters, or one or more natural disasters, and based on a determination that a fifth vehicle of the plurality of vehicles is currently docked with the at least one second platform, engage one or more clamps to secure the at least one fifth vehicle to the at least one second platform, wherein the one or more clamps comprise at least one of one or more magnetic clamps, one or more electro-magnetic clamps, or one or more mechanical clamps, and/or the like.

In some embodiments, the set of instructions, when executed by the at least one processor, might further cause the apparatus to: map two or more sixth vehicles of the plurality of vehicles; map two or more third platforms of the plurality of platforms; determine the status of each of the two or more sixth vehicles, based at least in part on the at least one first data corresponding to each of the two or more sixth vehicles; determine the status of each of the two or more third platforms, based at least in part on the at least one second data corresponding to each of the two or more third platforms; and coordinate movement of at least one of the two or more sixth vehicles in relation to at least one of the two or more third platforms, based at least in part on the status of each of the two or more sixth vehicles and on the status of each of the two or more third platforms.

In yet another aspect, a system might comprise a computing system, at least one first vehicle, and at least one first platform. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to:

receive at least one first data from each of a plurality of vehicles of a self-organizing mobile network ("SOMNET") of vehicles, the at least one first data comprising status data regarding each vehicle of the plurality of vehicles; receive at least one second data from each of a plurality of platforms, the at least one second data comprising status data regarding each platform of the plurality of platforms; analyze the at least one first data to determine a status of each of the plurality of vehicles; analyze the at least one second data to determine a status of each of the plurality of platforms; and based at least in part on the analyzed at least one first data and the analyzed at least one second data, generate at least one of one or more first control instructions to at least one first vehicle of the plurality of vehicles or one or more second control instructions to at least one first platform of the plurality of platforms, the one or more first control instructions causing each of the at least one first vehicle to perform one or more first actions, and the one or more second control instructions causing each of the at least one first platform to perform one or more second actions.

The at least one first vehicle might each comprise a propulsion system, at least one second processor, and a second non-transitory computer readable medium communicatively coupled to the at least one second processor. The second non-transitory computer readable medium might have stored thereon computer software comprising a second set of instructions that, when executed by the at least one second processor, causes the vehicle to: receive one of the one or more first control instructions; and perform the one or more first actions, based at least in part on the received one of the one or more first control instructions.

The at least one first platform might each comprise at least one third processor and a third non-transitory computer readable medium communicatively coupled to the at least one third processor. The third non-transitory computer readable medium might have stored thereon computer software comprising a third set of instructions that, when executed by the at least one third processor, causes the platform to: receive one of the one or more second control instructions; and perform the one or more second actions, based at least in part on the received one of the one or more second control instructions.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-9 illustrate some of the features of the method, system, and apparatus for implementing wireless communications and self-organizing networks ("SONs"), and, more particularly, to methods, systems, and apparatuses for implementing self-organizing mobile networks ("SOMNETs") of drones and platforms, as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

With reference to the figures, FIG. 1 is a schematic diagram illustrating a system 100 for implementing self-organizing mobile networks ("SOMNETs") of drones and platforms, in accordance with various embodiments.

In the non-limiting embodiment of FIG. 1, system 100 might comprise one or more vehicles 105, which might comprise one or more manned vehicles 110a-110n (collectively, "manned vehicles 110" or the like) and/or one or more unmanned vehicles 115a-115n (collectively, "unmanned vehicles 115" or the like). At least one vehicle 105 of the one or more vehicles 105 might be one of proximate to or within at least one geographic area 130 (e.g., a residential neighborhood, a business center, an office park, a portion of a city or town, a transit station or depot, etc.). In some instances, each manned vehicle 110 might include, but is not limited to, one of a car, a motorcycle, an all-terrain vehicle, a truck, a van, a semi-trailer truck, an aircraft, a subterranean vehicle, an amphibious vehicle, or a water craft, and/or the like. In some cases, each unmanned vehicle 115 might include, without limitation, one of an aerial drone, a land-based drone, a water-based drone, a subterranean drone, an amphibious drone, a robot, or an autonomous vehicle, and/or the like. System 100 might further comprise one or more platforms 120a-120n (collectively, "platforms 120" or the like) and one or more user devices 125a-125n (collectively, "user devices 125" or the like). According to some embodiments, each of the one or more user devices 125 might include, without limitation, one of a laptop computer, a tablet computer, a smart phone, a mobile phone, a personal digital assistant, an Internet of things ("IoT") device, a set-top box, a video recording and/or playback device, an audio recording and/or playback device, or a portable gaming device, and/or the like. The platforms 120 and the user devices 125 each might also be one of proximate to or within the at least one geographic area 130. System 100 might further comprise one or more wireless network nodes 135, one or more networks 140, one or more computing systems 145, and one or more databases 150, and/or the like. Each vehicle 105 might communicate with at least one of one or more (other) manned vehicles 110, one or more (other) unmanned vehicles 115, one or more platforms 120, one or more user devices 125, and/or one or more wireless network nodes 135 via wireless communications, as depicted in FIG. 1 by lightning bolt symbols.

In operation, a computing system (which might be embodied by at least one of one or more manned vehicles 110, one or more unmanned vehicles 115, one or more platforms 120, one or more user devices 125, one or more wireless network nodes 135, one or more computing systems 145, a cloud computing system (not shown), and/or the like) might receive one or more requests for one of a plurality of vehicles 105 to perform one or more tasks; might receive at least one first data from at least one first vehicle 105 of the plurality of vehicles 105, the at least one first data comprising data regarding one or more second vehicles 105 of the plurality of vehicles 105 of a self-organizing mobile network ("SOMNET") of vehicles 105; and might analyze the at least one first data to determine a status of at least one second vehicle 105 of the one or more second vehicles 105.

In response to receiving the one or more requests and based at least in part on a determination that the at least one second vehicle 105 is capable of performing at least one task of the one or more tasks, the computing system might generate one or more first control instructions and might send the one or more first control instructions to the at least one second vehicle 105, the one or more first control instructions causing each of the at least one second vehicle to perform one or more first actions. In response to receiving the one or more requests and based at least in part on a determination that the at least one second vehicle 105 is unable to perform the at least one task of the one or more tasks, the computing system might identify at least one third vehicle 105 of the one or more second vehicles 105 that is capable of performing the at least one task of the one or more tasks and within a predetermined geographic range (e.g., within the geographic area 130), might generate one or more second control instructions, and might send the one or more second control instructions to the at least one third vehicle 105, the one or more second control instructions causing each of the at least one third vehicle to perform the one or more first actions.

In alternative embodiments, the computing system might receive at least one first data from each of a plurality of vehicles 105 of a self-organizing mobile network ("SOMNET") of vehicles 105, the at least one first data comprising status data regarding each vehicle 105 of the plurality of vehicles 105; might receive at least one second data from each of a plurality of platforms 120, the at least one second data comprising status data regarding each platform 120 of the plurality of platforms 120; might analyze the at least one first data to determine a status of each of the plurality of vehicles 105; and might analyze the at least one second data to determine a status of each of the plurality of platforms 120. Based at least in part on the analyzed at least one first data and the analyzed at least one second data, the computing system might generate at least one of one or more first control instructions to at least one first vehicle 105 of the plurality of vehicles 105 or one or more second control instructions to at least one first platform 120 of the plurality of platforms 120, the one or more first control instructions causing each of the at least one first vehicle 105 to perform one or more first actions, and the one or more second control instructions causing each of the at least one first platform 120 to perform one or more second actions.

In various embodiments, the SOMNET of vehicles/drones and platforms might be used to expand, augment, or fill gaps in wireless network coverage, as described in detail in '523 Application, which has been incorporated herein by reference in its entirety for all purposes.

According to some embodiments, the SOMNET of vehicles/drones and platforms might be used to monitor or track crimes and/or traffic accidents. In such cases, autonomous or piloted vehicles or drones might be equipped with cameras and/or microphones that may record live video, live audio, and/or still photographs of ongoing crimes and/or ongoing traffic accidents, and might send the live video, the live audio, and/or the still photographs of ongoing crimes and/or ongoing traffic accidents to the platform, which might forward (in some cases via a remote computing system) to a master controller, communications system of the police or emergency responders, communications system of hospitals or emergency rooms ("ERs"), and/or the like. In some cases, law enforcement agencies or the military might utilize the SOMNET of vehicles/drones and platforms to track one or more persons (e.g., criminals, terrorists, or VIPs under protection, etc.) or one or more objects (e.g., targeted vehicles, cavalcades, bombs, missiles, etc.), and/or the like.

In some embodiments, the SOMNET of vehicles/drones and platforms might be used to monitor or track (and in some cases predict) weather conditions. In such cases, autonomous or piloted vehicles or drones might be equipped with weather sensors (including, but not limited to, at least one of one or more pressure sensors, one or more temperature sensors, one or more motion sensors, one or more solar light sensors, one or more ambient light sensors, one or more infra-red sensors, one or more ultra-violet sensors, one or more sound sensors, one or more seismic sensors, one or more air quality sensors, one or more moisture sensors, one or more wind sensors, or one or more particulate sensors, and/or the like). According to some embodiments, weather sensor data might also include historic data based on photographs, videos, or other sensors, and/or the like. The weather sensor data can be sent to the platforms, master controllers, or meteorologists, or the like. Based on an analysis of the weather sensor data, weather conditions can be monitored, tracked, and/or predicted. Based on such analysis, it can be determined whether climate change has occurred, which areas may be damaged or impacted due to storms or other weather conditions, or locations where repairs need to be made, and/or the like. Based on such analysis, it can also be determined whether one or more vehicles or drones should be stowed indoors. If so, the vehicles or drones might be sent to hangars or other covered enclosures to wait out the weather conditions. Alternatively, or additionally, clamps (e.g., magnetic, electro-magnetic, and/or mechanical clamps, or the like) may be deployed to secure the docked drones or vehicles to the platforms.

According to some embodiments, the SOMNET of vehicles/drones and platforms might be used to recover or repair disabled, damaged, or inoperable vehicles or drones (or disabled, damaged, or inoperable telecommunications equipment). In such cases, a vehicle or drone might be deployed to the last known location of the disabled, damaged, or inoperable vehicle or drone, and might search for the disabled, damaged, or inoperable vehicle or drone if not at the last known location. Once a disabled, damaged, or inoperable vehicle or drone is located, the searching drone or vehicle might attempt to identify the disabled, damaged, or inoperable vehicle or drone (e.g., by scanning QR codes (if visible), by scanning for RFID codes (if within range), by image recognition of characteristics of the disabled, damaged, or inoperable vehicle or drone, by monitoring emergency pings, distress signals, dying gasp signals, or the like from the disabled, damaged, or inoperable vehicle or drone (if any), and/or the like). In some cases, the searching drone might ping the seemingly disabled, damaged, or inoperable drone to determine if it is functional or in need of assistance. In some instances, the distress signal might be sent from a black box in the drone, the black box having its own dedicated power source (e.g., its own batteries, solar power, etc.). Alternatively, the drone might send out a dying gasp signal indicating the drone's current location and/or any information pertinent to the drone's status (e.g., battery level, damage status, maintenance status, errors, etc.), prior to power loss or full equipment malfunction, and/or the like.

In some embodiments, the SOMNET of vehicles/drones and platforms might be used to communicatively couple autonomous or piloted vehicles to platforms. In such cases, the vehicles and platforms might exchange information regarding which autonomous or piloted vehicles have reserved space at which platforms (or have authorization to dock with which platforms), might exchange location information, might exchange travel paths (e.g., flight, drive, or navigation paths, or the like), might determine available platforms with which to dock (e.g., for recharging, for battery replacement, for repairs, for tool installation, for tool exchange, for software updating, and/or the like), and/or the like. The types of communication amongst the vehicles and platforms might include, without limitation, mobile network communications, satellite communications, radio frequency ("RF") communications, near field communications ("NFC"), communications tower signals, 3.5 GHz band communications, wireline or wireless communications, community Wi-Fi communications, and/or the like. The platforms (including landing pads, charging stations, and/or the like) may also be networked together in order to track vehicles and drones, and to coordinate the drones when the pad will be available for docking or the like. In some cases, network management may be used to maximize servicing the greatest number of vehicles or drones in a geographic area, to ensure that the vehicles or drones are charged or otherwise powered, and to optimize travel times or distances, and/or the like. In some instances, information may be passed or exchanged to verify compatibility, capability, reliability, range, charged state, and/or the like, with coordinates being passed along with a payload when such information is verified or otherwise determined to meet requirements of a task to be performed by the one or more vehicles or drones.

In a similar manner, the SOMNET of vehicles might be used to communicatively couple autonomous or piloted vehicles with other autonomous or piloted vehicles. In such cases, the vehicles might exchange location information (in some cases, by first obtaining location information by communicating with mobile devices or GPS devices or the like that are within wireless communications range, or the like), might exchange travel paths (e.g., flight, drive, or navigation paths, or the like), might allow or permit particular drones or autonomous vehicles to control other drones or autonomous vehicles, and/or the like. The types of communication amongst the vehicles and platforms might include, without limitation, mobile network communications, satellite communications, radio frequency ("RF") communications, near field communications ("NFC"), communications tower signals, 3.5 GHz band communications, wireline or wireless communications, community Wi-Fi communications, and/or the like. In some embodiments, communications may be standardized amongst drones or vehicles. In some cases, this might permit payload transfer or enable public/private partnerships. For example, a private individual might own a drone and might enable his or her drone to participate in a partnership to deliver payloads or packages for other individuals or companies within the drone's coverage area. In some cases, a service provider might facilitate such renting out of drones, and might verify a renting operator's license or ability to fly the drone. Incentives, in some instances, might be provided to the owner of property to house drones or autonomous vehicles on his or her private property (such drones or vehicles being owned or operated by a service provider).

With reference to delivery of packages, packages (including, but not limited to merchandize from e-tailers, local businesses, or the like, legal documents from/to lawyers to/from individuals/companies, medicine/biomaterials/organs from pharmacies, hospitals, or the like, food from local groceries or restaurants, and/or the like) might be delivered to a customer, either at the location of a cellphone, smart watch, or vehicle associated with the customer (using GPS data from the customer's device or vehicle, using navigation path data from the customer's device or vehicle (to allow for plotting an intercept course), etc.) or at a specified delivery point (e.g., at the customer's home, in the front yard or back yard of the customer's home, at the customer's work location, at the current location of the customer's vehicle, at the current location of the customer's smartphone, at a pre-registered address, location, or coordinates, at a particular remote location, etc.). In some cases, the drones or autonomous vehicles might allow other drones or vehicles to control one another. In some instances, a drone might communicate with a car to open its window to deliver a package (in some cases, with the car controlling the drone to fly through the window) or to communicate with a home-based system to open a door or window of the home to deliver a package (in some cases, with the home-based system controlling the drone to fly through the door or window).

In some cases, packages or drones delivering the packages may be tracked or monitor during delivery (either by the seller, the buyer, or the company deploying the drones). Arrival times, departure times, delivery statuses, and/or the like may be tracked or monitored. In some cases, live video, live audio, and/or still photographs may be captured and sent to the platform(s), to a master controller, to the seller, to the buyer, to the sender, to the recipient, and/or the company deploying the drones, so that the live video, live audio, and/or still photographs may be viewed by one or more users (i.e., the seller, the buyer, the sender, the recipient, and/or an employee of the company deploying the drones, etc.). In some embodiments, a mobile platform (such as described below with respect to FIG. 4A) might be used to drive or fly one or more drones to a specified location and to release the one or more drones within a particular area to deliver packages (in some cases, to provide last mile delivery of packages, or the like). In some cases, one or more platforms (whether mobile or stationary) might comprise storage units for storing one or more packages in order to implement or facilitate implementation of a distributed warehouse system for more rapid "just-in-time" delivery of packages, or the like, and/or to extent existing commercial delivery options. Zones may be established for delivery, with particular drones being assigned to delivery in particular delivery areas (e.g., port drones delivering within a port, residential drones delivering within residential neighborhoods, city drones delivery within a city's city limits, etc.), where the size of the drones might be determined or assigned based on delivery areas (e.g., smaller drones for urban areas, larger drones for rural areas, etc.).

In some instances, security measures may be implemented to ensure that packages are delivered only to authorized users—in some cases, by delivering to a user possessing an authorized phone, by delivering to a particular address, by verifying biometric data from a receiving party, and/or the like. In some cases, drones might be equipped with delivery boxes, with the package being placed in the delivery box to be delivered by the drone. In some instances, the delivery box might be thermal insulated (to safely deliver cold packages or to safely deliver warm/hot packages), might be weather resistant, might be water resistant or water proof, might have built-in security devices that allow only authorized recipients to open, and/or the like. In some embodiments, communications amongst drones (and/or amongst drones and platforms) might facilitate payload transfer, with the system determining whether it is more efficient for one drone to hand-off the package to another drone (e.g., if the distance for delivery exceeds battery capacity of the first drone or if the first drone is too large to fit a particular area so it hands off the package to a smaller drone that can fit in the particular area, and so on). In some cases, times may be reserved for delivery of packages. In some instances, a customer may be charged based on the geographic zones or areas in which the package is delivered or through which the drone(s) must travel to deliver the packages. In some embodiments, the platforms may also be a distributed warehouse for a variety of businesses needing repair parts. The platforms keep track of inventory based on identification methods that may include, without limitation, RFID, BlueTooth, QR codes, bar codes, shape recognition, and/or the like.

According to some embodiments, the SOMNET of vehicles/drones and platforms might be used to repair telephone poles or other telecommunications equipment, to deliver tools to technicians on site, to identify problems within a network (e.g., using one or more cameras, one or more microphones, one or more communications testing devices, etc.) prior to technicians or tool-equipped drones being deployed. In such cases, live video, live audio, and/or still photographs may be captured and sent to the platform, master controller, and/or service provider, or the like.

In some embodiments, the SOMNET of vehicles/drones and platforms might be used to remotely disable or remotely control autonomous or piloted vehicles. For example, drones or vehicles might be remotely disabled (or remotely controlled to return to a base location) based on a predetermined amount of time the drones or vehicles have not communicated with other vehicles and/or platforms. In some cases, drones or vehicles might be remotely disabled (or remotely controlled to return to a base location or to an authorized location or flight/navigation path) based on entry into restricted zones (e.g., government property, airport property, national parks, etc.). Such kill or control switches might be installed on the vehicles or drones, so that functionality of the vehicles or drones (other than the ability to send a distress signal) might be disabled after sending a distress signal to prevent unauthorized persons from using the disabled, damaged, or inoperable vehicles or drones. In some instances, anti-theft features of drones or vehicles might include, without limitation, a black box (which has its own dedicated source or power, such as solar power, battery power, etc.) that sends out a distress signal when the drone or vehicle has become disabled, damaged, or inoperable, sensors to determine if a person is approaching (with audible anti-theft messages or alarms being projected to warn the approaching person against unauthorized use or theft), stickers (which might include, QR codes, bar codes, other identifiers, or the like) on the drone or vehicle identifying the owner and how to contact or return to the owner (with return delivery or shipping of the drone, in some cases, being auto-charged to the owner, cameras to capture photographs, audio, or videos of unauthorized persons approaching the drone (with the captured photographs, audio, or videos being sent to the owner or a tracking service), or the like.

According to some embodiments, the SOMNET of vehicles/drones and platforms might be used to track and monitor drones or vehicles (and also platforms) to determine whether maintenance is required (either upcoming or past due maintenance), and to schedule or deploy drones, vehicles, or technicians to perform such maintenance. In some instances, the SOMNET of vehicles/drones and platforms might utilize visual recognition to enable drones to find and collect litter, or to retrieve hats and other articles that have blown away or have landed in inaccessible areas, or the like.

In some embodiments, the SOMNET of vehicles/drones and platforms might be used to coordinate travel paths of drones or vehicles, and in some cases, to update, modify, or reroute such travel paths in real time (e.g., for delivery of payloads or packages, to guide drones or vehicles to battery replacement/charging platforms, to send drones or vehicles to other locations, etc.), based on change in location of a target, based on prioritized reservations, based on monitored weather conditions, based on timeliness or tardiness of the drones or vehicles, based on traffic conditions, and/or based on data collected by the SOMNET of vehicles/drones and platforms, etc. In some cases, artificial intelligence ("AI") and/or machine learning might be used to enable self-learning of the environment, travel paths, hazards, etc.

These or other features and functionalities of the SOMNET of vehicles/drones and platforms are described below with respect to FIGS. 2-7.

Figure 2:
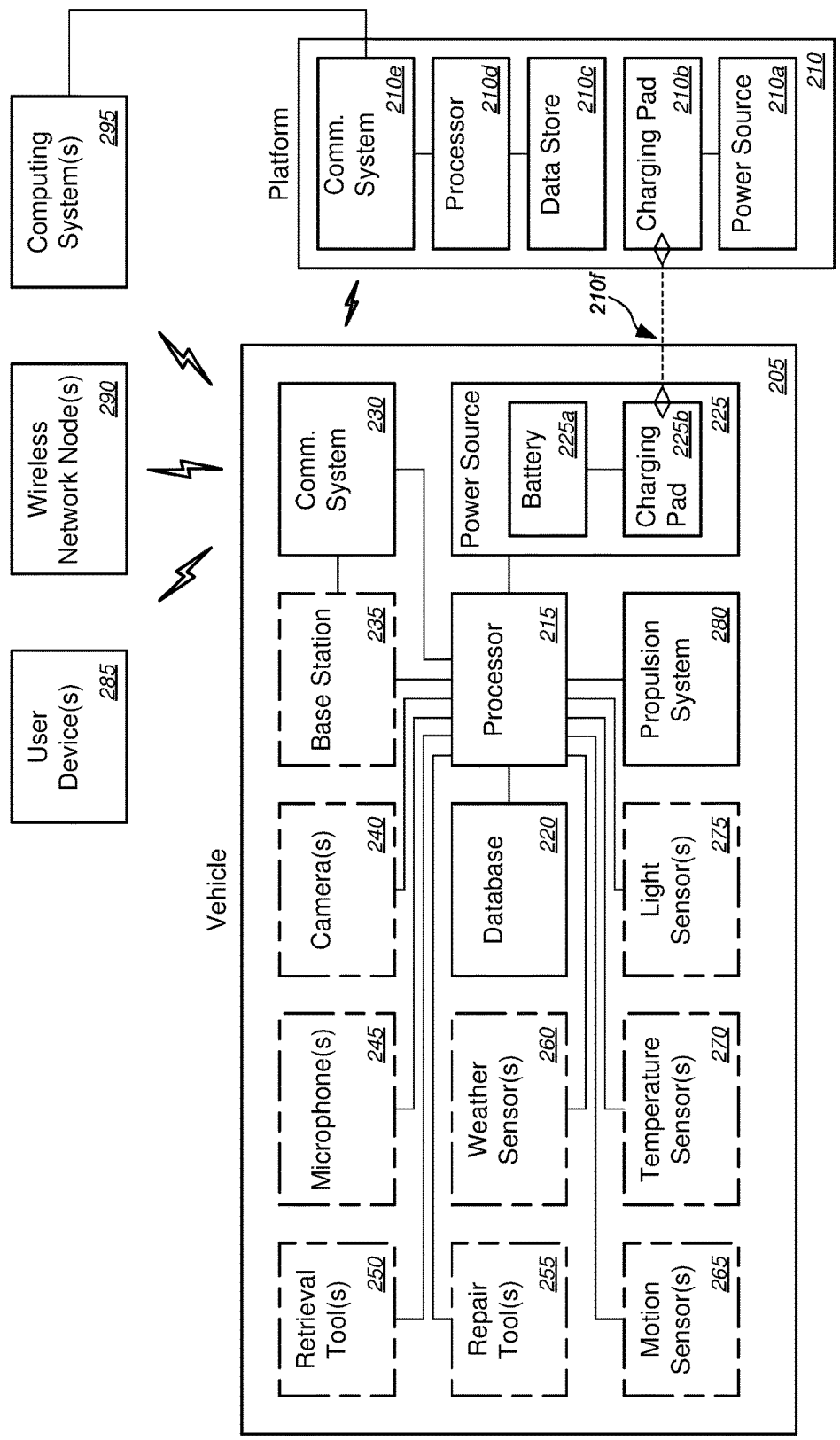
FIG. 2 is a schematic diagram illustrating another system for implementing SOMNETs of drones and platforms, in accordance with various embodiments.

FIG. 2 is a schematic diagram illustrating another system 200 for implementing SOMNETs of drones and platforms, in accordance with various embodiments.

In the non-limiting embodiment of FIG. 2, system 200 might comprise a vehicle 205 and a platform 210. The vehicle 205 might comprise one of a manned vehicle or an unmanned vehicle. Each manned vehicle might include, but is not limited to, one of a car, a motorcycle, an all-terrain vehicle, a truck, a van, a semi-trailer truck, an aircraft, a subterranean vehicle, an amphibious vehicle, or a water craft, and/or the like. Each unmanned vehicle might include, without limitation, one of an aerial drone, a land-based drone, a water-based drone, a subterranean drone, an amphibious drone, a robot, or an autonomous vehicle, and/or the like. Each vehicle 205 might further comprise a processor(s) 215, a database 220, a power source 225, a communications system 230, a base station 235 (optional), one or more cameras 240 (optional), one or more audio sensors or microphones 245 (optional), one or more retrieval tools 250 (optional), one or more repair tools 255 (optional), one or more weather sensors 260 (optional), one or more motion sensors 265 (optional), one or more temperature sensors 270 (optional), one or more light sensors 275 (optional), one or more propulsion systems 280, and/or the like. In some embodiments, the one or more weather sensors 260 might include, but not limited to, at least one of one or more pressure sensors, one or more temperature sensors, one or more motion sensors, one or more solar light sensors, one or more ambient light sensors, one or more infra-red sensors, one or more ultra-violet sensors, one or more sound sensors, one or more seismic sensors, one or more air quality sensors, one or more moisture sensors, one or more wind sensors, or one or more particulate sensors, and/or the like. In some cases, the one or more propulsion systems 280 might be based at least in part on electrical motors, gas-operated motors, solid-fuel-operated motors, liquid-fuel-operated motors, etc., which might use fuel containers that can be exchanged in a similar manner as exchangeable batteries 225a, or the like.

According to some embodiments, the power source might include, without limitation, one or more batteries 225a, one or more charging pads 225b, and/or the like. Merely by way of example, in some instances, the platform 210 might include, without limitation, a power source 210a, a charging pad 210b, a data store 210c, a processor(s) 210d, and a communications system 210e, and/or the like. The power source 210a, in some cases, might be at least one of wired (in an electrical or utility grid), solar-powered, wind-powered, geo-thermal-powered, electric-generator-powered, and/or battery-based, etc. The charging pad 210b might be similar or at least complementary to charging pad 225b of vehicle 205, and in some instances, might transfer power to charging pad 225b via inductive charging or some other wireless charging, and/or the like (as depicted in FIG. 2 by the diamond-ended dashed line 210f). In some embodiments, alternative to the inductive charging system, other charging systems might include, without limitation, contact charging system (e.g., in which charging pads 210b and 225b might comprise electrical contacts that when in physical contact with each other might allow electrical charging to the vehicle 205, as depicted by diamond-ended dashed line 210f, or the like). In some instances, multiple charging pads on each of the vehicle 205 and the platform 210 (whether inductive or contact—based, or the like) might be provided to allow for zonal charging, thereby improving (i.e., reducing) the time it takes to recharge the battery 225a on the vehicle 205.

In some embodiments, the communications system 230 and/or the communications system 210e might each include, but is not limited to, one or more antennas, one or more wireless transceivers, and one or more communications sub-systems, and/or the like. In some cases, the one or more wireless transceivers might communicate with other devices, including, but not limited to, one or more vehicles (or drones 205), one or more platforms 210, one or more user devices 285, one or more wireless network nodes 290, and/or one or more computing systems 295, using any one or a combination of the wireless protocols described herein (including, but not limited to, 2.4 GHz or 5 GHz WiFi, Bluetooth, Z-wave, ZigBee, etc.), or the like. In FIG. 2, wireless communications are depicted by lightning bolt symbols. Merely by way of example, according to some embodiments, the wireless communications might be based on wireless communications protocols or standards including, but not limited to, at least one of 2G standard, 3G standard, 4G standard, 5G standard, Wi-Fi standard, LoRa standard, or random phase multiple access ("RPMA") standard, and/or the like. In some instances, the wireless network communications might include, without limitation, at least one of a wireless mesh, a point-to-point wireless communications link, a point-to-multi-point wireless communications link, or a microwave link, and/or the like. In some embodiments, the at least one wireless network node might comprise a wireless access point ("WAP") or the like. In some embodiments, compute resources might be local to the vehicle or platform (e.g., as embodied by processor 215 of vehicle 205 or by processor 210d of platform 210, or the like, or the like). This allows for autonomous actions, which might be necessary when communication with a remote compute resource (e.g., computing system(s) 295 or the like) is not possible, e.g., due to a power failure at the compute resource, or due to the vehicle being out of communication range, etc.

The vehicle 205, the platform 210, the user device(s) 285, the wireless network node(s) 290, and the computing system(s) 295 of system 200 of FIG. 2 might otherwise be the same as, or similar to, the one or more vehicles 105, the one or more platforms 120, the one or more user devices 125, the one or more wireless network nodes 135, and the one or more computing systems 145 respectively, of system 100 of FIG. 1, and similar descriptions apply to the components of system 200 of FIG. 2.

Figure 3:
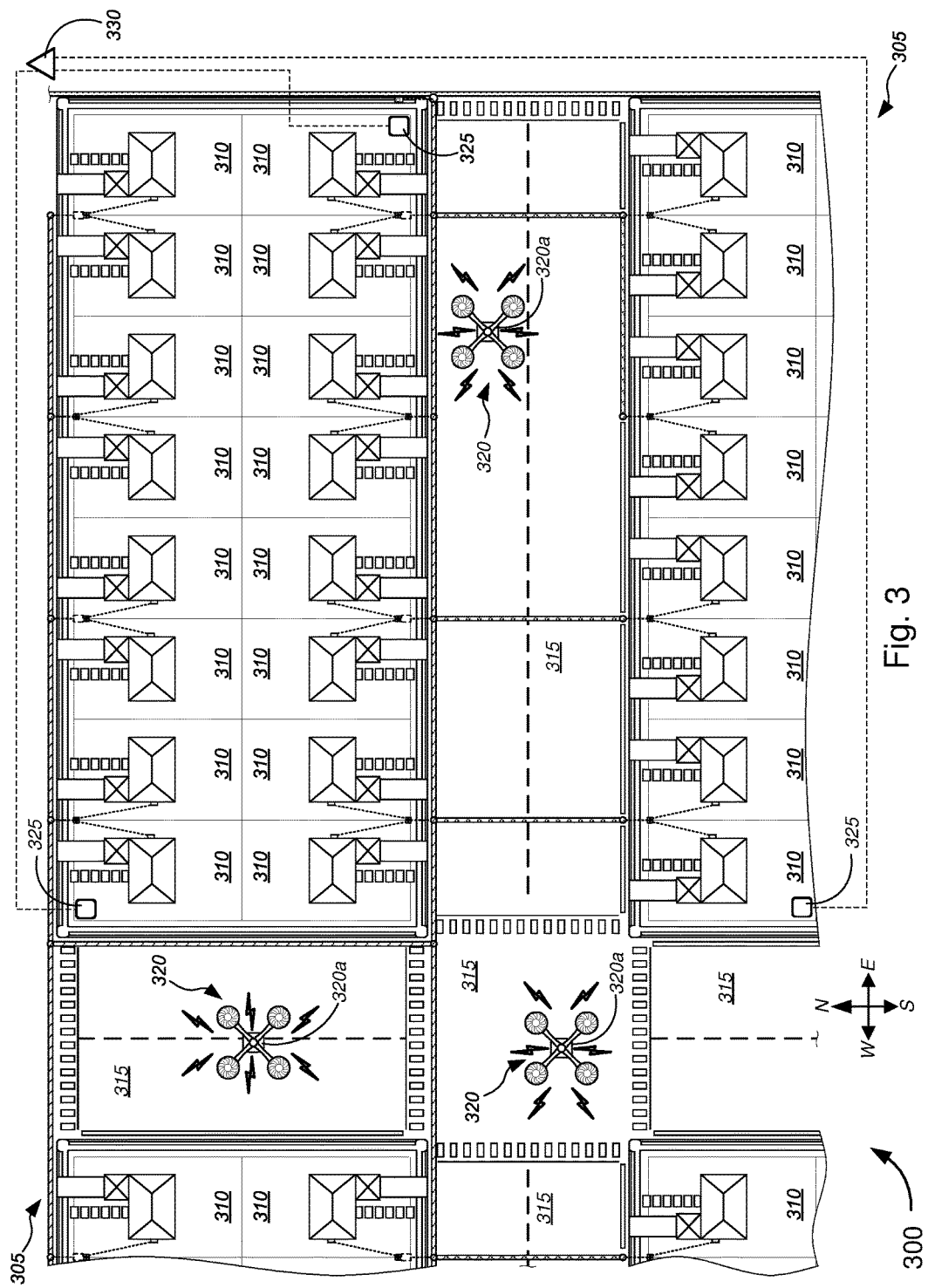
FIG. 3 is a schematic diagram illustrating a non-limiting embodiment for implementing SOMNETs of drones and platforms.

FIG. 3 is a schematic diagram illustrating a non-limiting embodiment 300 for implementing SOMNETs of drones and platforms. Embodiment 300 might comprise a plurality of customer premises 310 located within a geographic area 305. The customer premises 310 might each be adjacent to a roadway 315. Embodiment 300 might further comprise one or more vehicles 320, each including, without limitation, one of a manned vehicle or an unmanned vehicle. In some instances, each manned vehicle might include, but is not limited to, one of a car, a motorcycle, an all-terrain vehicle, a truck, a van, a semi-trailer truck, an aircraft, a subterranean vehicle, an amphibious vehicle, or a water craft, and/or the like. In some cases, each unmanned vehicle might include, without limitation, one of an aerial drone, a land-based drone, a water-based drone, a subterranean drone, an amphibious drone, a robot, or an autonomous vehicle, and/or the like. In the non-limiting embodiment of FIG. 3, the vehicles 320 are depicted as aerial drones (for purposes of illustration). Embodiment 300 might further comprise one or more platforms 325 on which the aerial drones 320 might land (or otherwise connect or make contact with), via which the aerial drones 320 might recharge, and/or with or via which the aerial drones 320 might wirelessly communicate so as to communicate with one or more wireless network nodes or wireless access points 330 (which are shown to communicatively couple with each platform 325 via dotted lines in FIG. 3). In some cases, the vehicles 320 might wirelessly communicate directly with the one or more wireless network nodes 330 (as depicted by the lightning bolt symbols around each vehicle 320).

For simplifying the illustration, the customer premises 310 are shown to be in a grid-like block pattern, and are shown to be of similar design and build. The grid-like block of customer premises is also shown to be oriented along particular cardinal directions (i.e., north, south, east, and west), as indicated in FIG. 3. However, the various embodiments are not so limited, and any arrangement of customer premises (of any variety of sizes and builds) may be applicable, in any arrangement or orientation with respect to the cardinal directions, as appropriate or desired. Moreover, the tools and techniques described herein may be implemented for established neighborhoods/blocks of customer premises or newly constructed ones.

Further, although FIG. 3 shows a plurality of customer premises that are single-family home residences within a neighborhood setting, the various embodiments are not so limited, and the various systems and methods described with respect to FIG. 3 may be applicable to any arrangement and type of customer premises (including, without limitation, customer residences, multi-dwelling units ("MDUs"), commercial customer premises, industrial customer premises, and/or the like) within one or more blocks of customer premises (e.g., residential neighborhoods, university/college campuses, office blocks, industrial parks, mixed-use zoning areas, and/or the like), in which roadways and/or pathways might be adjacent to each of the customer premises. Moreover, the embodiment as shown in FIG. 3 is not necessarily to scale, as the vehicles 320 (depicted as aerial drones in this embodiment) and the platforms 325 are enlarged relative to the customer premises 310 for clarity of illustration.

The one or more vehicles 320, the geographic area 305, the one or more platforms 325, and the wireless network node 330 of system 300 of FIG. 3 might otherwise be the same as, or similar to, the one or more vehicles 105, the geographic area 130, the one or more platforms 120, and the one or more wireless network nodes 135, respectively, of system 100 of FIG. 1, and similar descriptions apply to the components of system 300 of FIG. 3.

Figure 4A:
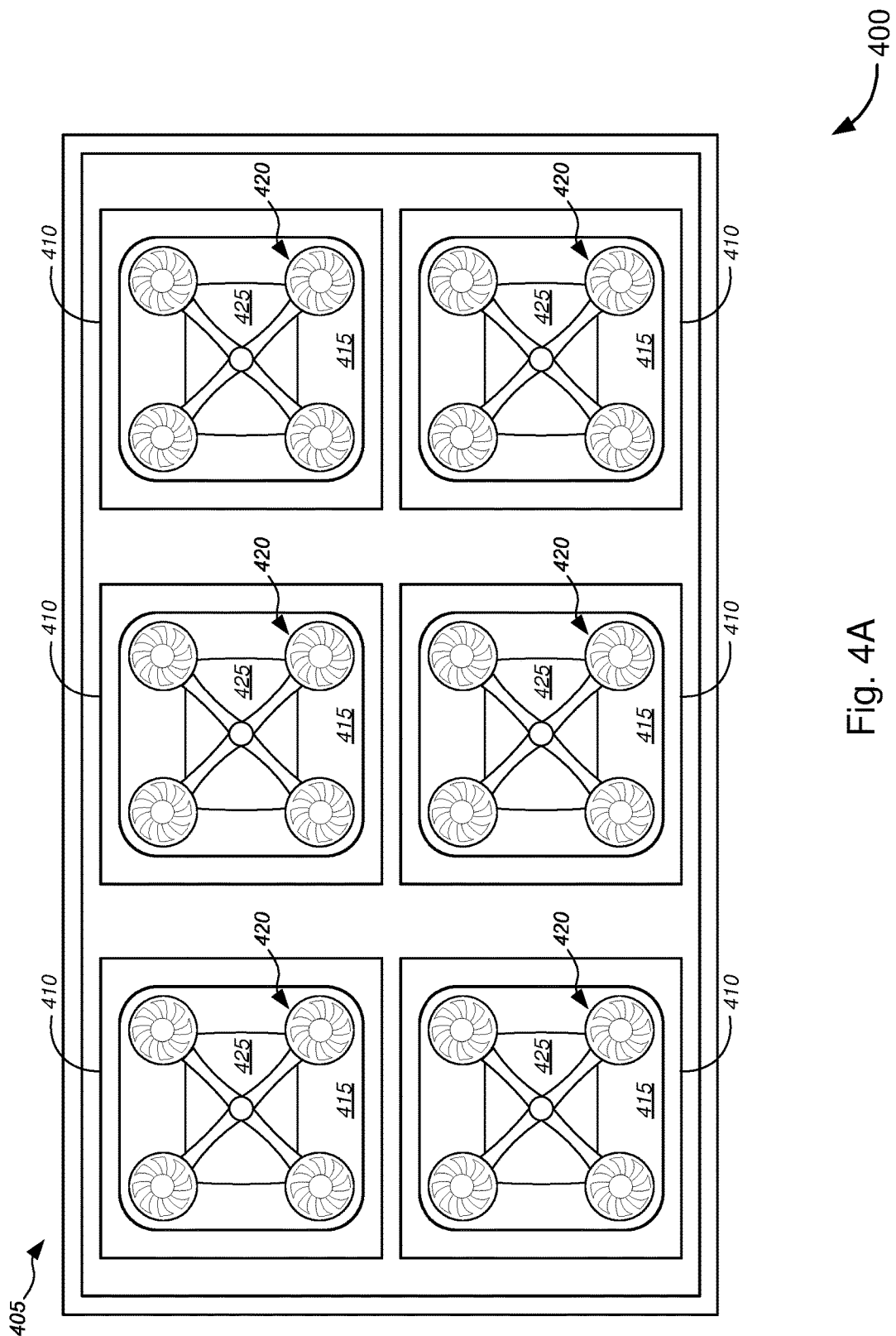
FIGS. 4A-4C are schematic diagrams illustrating various non-limiting embodiments for implementing SOMNETs of drones and platforms.
Figure 4B:
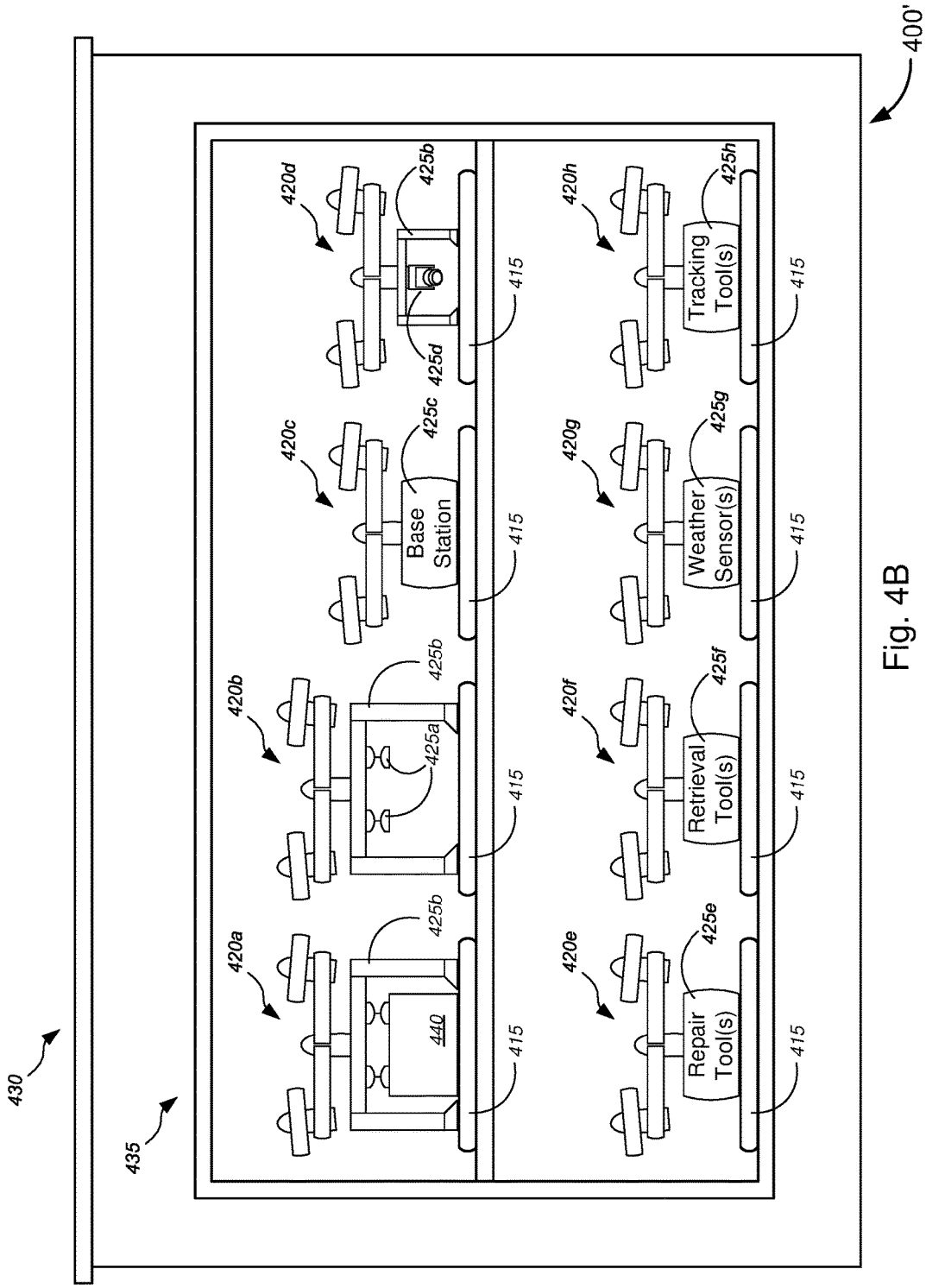
Figure 4C:
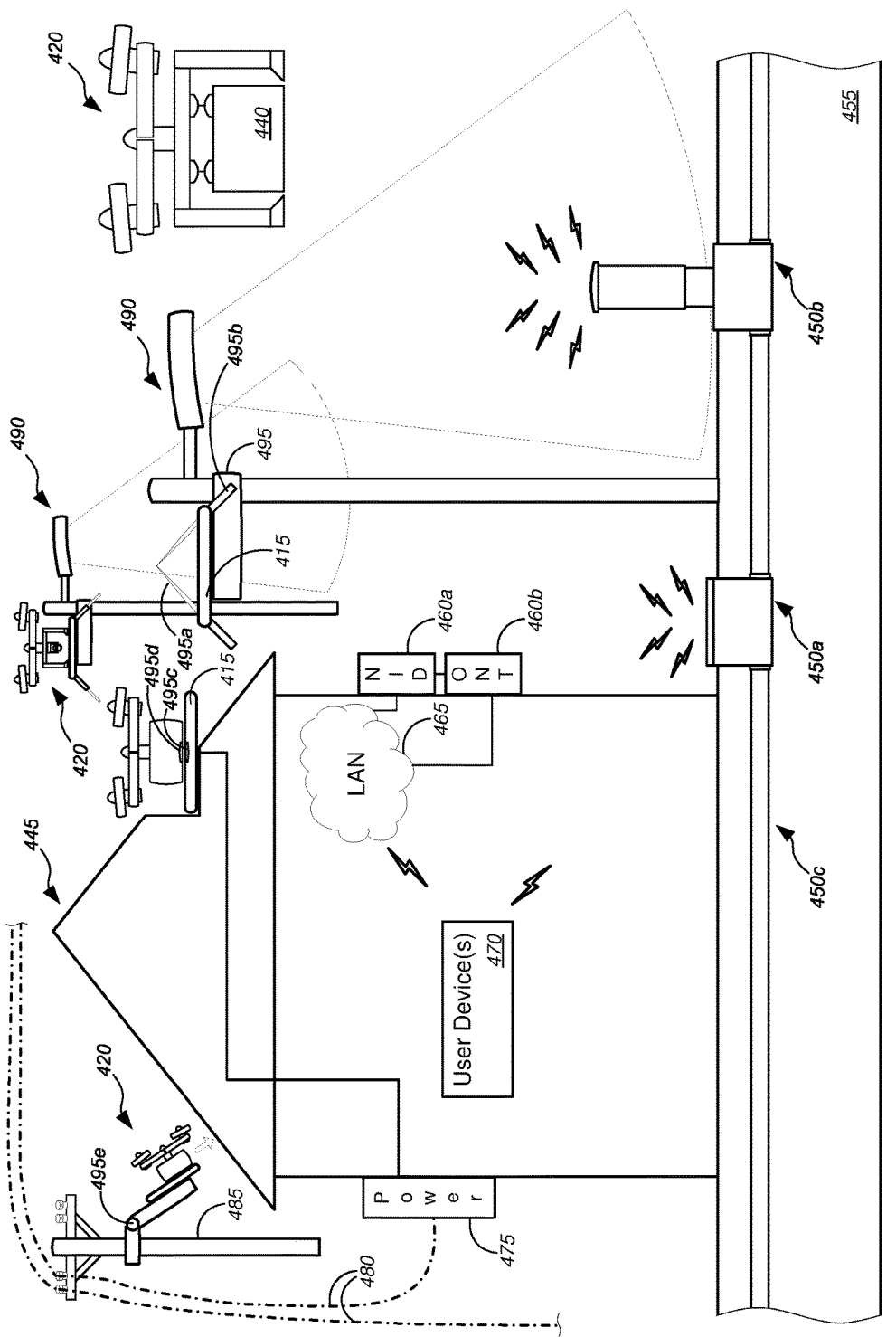

FIGS. 4A-4C (collectively, "FIG. 4") are schematic diagrams illustrating various non-limiting embodiments 400, 400', and 400" for implementing SOMNETs of drones and platforms. FIG. 4A depicts a top or plan view of a non-limiting embodiment 400 in which the platform might comprise one of a cargo-trailer-based platform, a cargo-container-based platform, a van-based platform, a truck-based platform, or a train-based or train car-based platform, and/or the like. FIG. 4B depicts an elevation view of a non-limiting embodiment 400' in which the platform might comprise one of a hangar-based platform, a building-based platform, and/or the like. FIG. 4C depicts a schematic diagram of a non-limiting embodiment 400" of a neighborhood in which the platforms might each comprise one of a telephone pole-based platform, a utility pole-based platform, a street-light (or lamp post) based platform, a roof-top-based platform, and/or the like. In the embodiments of FIG. 4, the vehicles are depicted as being aerial drones, but the various embodiments are not so limited, and the vehicles can be land-based drones, water-based drones, a subterranean drone, an amphibious drone, a robot, autonomous vehicles, and/or or other unmanned vehicles, or the like. In some cases, the vehicles can be manned vehicles each including, but not limited to, one of a car, a motorcycle, an all-terrain vehicle, a truck, a van, a semi-trailer truck, an aircraft, a subterranean vehicle, an amphibious vehicle, or a water craft, and/or the like. Also in the embodiments of FIG. 4, although the platforms are each depicted as one of a cargo-trailer-based platform, a cargo-container-based platform, a van-based platform, a truck-based platform, or a train-based or train car-based platform, a hangar-based platform, a building-based platform, a telephone pole-based platform, a utility pole-based platform, a street-light (or lamp post) based platform, a roof-top-based platform, and/or the like, the various embodiments are not so limited, and the platform can also be at least one of a tower-based platform, a buoy-based platform, a pedestal-based platform, an aircraft-based platform, or a boat-based platform, and/or the like. In fact, the platform can be any stationary or mobile platform (whether covered or uncovered) with which the vehicle or drone can dock, communicate, and/or recharge.

With reference to FIG. 4A, non-limiting embodiment 400 might comprise a platform 405, which, as indicated above, might include, without limitation, one of a cargo-trailer-based platform, a cargo-container-based platform, a van-based platform, a truck-based platform, or a train-based or train car-based platform, and/or the like. The platform 405, as shown from the top in FIG. 4A, might comprise one or more roof-top openings 410 (which might comprise sliding covers or doors, retractable covers or doors, or the like; not shown) through which one or more vehicles 420 may lift-off from sub-platforms 415. The one or more vehicles 420, as shown in the non-limiting embodiment of FIG. 4A, can take the form of aerial drones. Although the aerial drones 420 of FIG. 4A are depicted as being relatively large as the one of the cargo-trailer-based platform, the cargo-container-based platform, the van-based platform, the truck-based platform, or the train-based or train car-based platform can fit only six such aerial drones, the various embodiments are not so limited, and the aerial drones 420 (or any such vehicles used to form the SOMNET) can be of any size, from human hand-sized drones to large bird-sized drones, to human-transport sized drones, to cargo-transport sized drones, or the like.

Each of one or more vehicles 420 might comprise a payload section 425, which might be removable or fixed, and which might include, without limitation, at least one of one or more containers, one or more sets of stored tools, one or more sets of manipulable/working tools, one or more sets of arms, one or more sets of grappling devices, one or more sets of actuators, one or more sets of sensors, one or more wireless communications devices, one or more cameras, one or more audio sensors or microphones, and/or the like. In some embodiments, each sub-platform 415 might comprise a recharger system, which might include, but is not limited to, an inductive charging system, a contact charging system, a battery extractor, a battery loader, a battery replacement system, fuel container replacement system (e.g., gas container replacement system, solid fuel container replacement system, liquid fuel container replacement system, etc.), and/or the like. According to some embodiments, alternative or additional to the roof-top openings 410, the platform 405 might comprise at least one of one or more wall openings, one or more side door openings, or one or more rear door openings, and/or the like.

Turning to FIG. 4B, non-limiting embodiment 400' might comprise a building 430, which might include, but is not limited to, an aircraft hangar, a residential building, an office building, a commercial building, a garage, a central office ("CO"), a telecommunications shed, and/or the like. Embodiment 400' might further comprise a platform 435, which, as indicated above, might include, without limitation, one of a hangar-based platform, a building-based platform, and/or the like. According to some embodiments, the platform 435, as shown from the top in FIG. 4A, might comprise one or more shelves each comprising one or more sub-platforms 415. In some embodiments, each sub-platform 415 might comprise a recharger system, which might include, but is not limited to, an inductive charging system, a contact charging system, a battery extractor, a battery loader, a battery replacement/exchange system, and/or the like. In a non-limiting example, a drone might dock with a platform, and the system might swap batteries with the drone (with the depleted battery being removed or extracted from the drone and deposited in a storage area (which may or may not have battery recharging capabilities to recharge the extracted battery), while a full battery is inserted into the battery slot of the drone. In such cases, the drones and platforms might be designed to facilitate easy swapping of batteries. In some instances, during the battery swap, the drone might be powered through the platform (e.g., with a non-removable battery of the drone being charged via inductive or contact charging during swapping of the removable battery, or the like). According to some embodiments, each of one or more vehicles 420 (such as manually controlled or autonomous drones, or the like) might dock with one of the one or more sub-platforms 415. Although not shown, the building 430 (e.g., a drone home or the like) might comprise at least one of one or more hangar doors, one or more garage doors, one or more front doors, one or more side doors, one or more rear doors, and/or the like.

Merely by way of example, in some cases, the one or more vehicles 420 might each include, without limitation, a delivery drone 420a or 420b, a wireless communications extension drone 420c, a surveillance or monitoring drone 420d, a repair drone 420e, a retrieval drone 420f, a weather monitoring drone 420g, a tracking drone 420h, and/or the like. In some embodiments, delivery drones 420a or 420b might comprise package retrieval/delivery tools 425a, which might include, but are not limited to, one or more sets of grappling devices, one or more hooks, one or more clamps, one or more winches, one or more containers, one or more sets of actuators, and/or the like. In some instances, one or more of the drones 420 might comprise legs or landing struts 425b, or the like. In some cases, the wireless communications extension drones 420c might include, without limitation, at least one of one or more base stations, one or more wireless transceivers, one or more wireless communications devices, and/or the like (collectively, "base stations 425c" or the like). According to some embodiments, the surveillance or monitoring drones 420d and/or the tracking drones 420h (as well as any of the other drones 420) might comprise at least one of one or more cameras, one or more audio sensors, one or more microphones, one or more tracking sensors, and/or the like (collectively, "monitoring tools 425d" or "tracking tools 425h," or the like). In some cases, the one or more tracking sensors might include, without limitation, at least one of one or more proximity sensors, one or more infra-red sensors, one or more thermal-imaging sensors, and/or the like. In some instances, the repair drones 420e might comprise one or more repair tools 425e including, but not limited to, one or more sets of manipulable tools, one or more sets of working tools, one or more sets of repair tools, one or more sets of arms, one or more sets of actuators, and/or the like. In some cases, the retrieval drone 420f might comprise one or more retrieval tools 425f including, without limitation, one or more sets of manipulable tools, one or more sets of working tools, one or more sets of retrieval tools, one or more sets of arms, one or more sets of grappling devices, one or more hooks, one or more clamps, one or more winches, one or more containers, one or more sets of actuators, and/or the like. In some embodiments, the weather monitoring drone 420g might comprise one or more weather sensors 425g each including, without limitation, at least one of one or more pressure sensors, one or more temperature sensors, one or more motion sensors, one or more solar light sensors, one or more ambient light sensors, one or more infra-red sensors, one or more ultra-violet sensors, one or more sound sensors, one or more seismic sensors, one or more air quality sensors, one or more moisture sensors, one or more wind sensors, or one or more particulate sensors, and/or the like.

The aerial drones 420a-420h of FIG. 4B (or any vehicles used to form the SOMNET) can be of any size, from human hand-sized drones to large bird-sized drones, to human-transport sized drones, to cargo-transport sized drones, or the like.

Referring to FIG. 4C, non-limiting embodiment 400" might comprise one or more platforms 415, one or more vehicles 420, customer premises 445, one or more ground-based signal distribution devices 450a or 450b (which might include, without limitation, one or more hand holes 450a, one or more flowerpot hand holes (not shown), one or more pedestal platforms 450b, one or more network access point ("NAP") platforms (not shown), one or more fiber distribution hub ("FDH") platforms (not shown), and/or the like that are described in greater detail in U.S. patent application Ser. No. 14/316,665 (the "'665 Application"), filed on Jun. 26, 2014 by Thomas Schwengler et al., entitled, "Wireless Access Point in Pedestal or Hand Hole," and U.S. patent application Ser. No. 14/316,676 (the "'676 Application"), filed on Jun. 26, 2014 by Thomas Schwengler et al., entitled, "Wireless Distribution Using Cabinets, Pedestals, and Hand Holes," which are incorporated herein by reference in their entirety for all purposes). Each of these ground-based signal distribution devices may be used to transmit and receive (either wirelessly or via wired connection) data, voice, video, and/or power signals to and from one or more utility poles, one or more customer premises, and/or one or more mobile user devices, apical conduit systems (as described in detail in the '676 and the '665 applications, which have already been incorporated herein by reference in their entirety), or the like. The one or more ground-based signal distribution devices 450a or 450b might communicatively couple with a central office or other service provider facility, or the like, via one or more lines (including, but not limited to, copper signal lines, fiber optic lines, power lines, and/or the like) that are routed through one or more conduits 450c, which (like at least the containers of the one or more ground-based signal distribution devices 450a or 450b) might be buried in ground 455 (i.e., with a top portion substantially level with a ground surface of ground 455 or buried below the ground surface of ground 455, or the like). Antennas or other wireless transceivers in the lid, within the container, and/or within the pedestal portion of the one or more ground-based signal distribution devices 450a or 450b might wirelessly relay, via the conduit 450c, communications (i.e., data, voice, video, and/or power signal communications, or the like) via the one or more lines that are routed through the conduits 450c from/to the central office (or other service provider facility) to/from at least one of network interface device ("NID") 460a, optical network terminal ("ONT") 460b, a local area network ("LAN") 465, one or more user devices 470, and/or the like.

Embodiment 400" might further comprise a power relay system 475 (e.g., breaker box or the like), which might be disposed on a wall of (a building; e.g., an exterior wall of the building of) the customer premises 445, that relays power over one or more power lines 480 (which might be relayed near the customer premises via one or more utility poles 485 or via one or more underground power distribution systems (not shown), or the like). In some cases, embodiment 400" might further comprise street lights or lamp post(s) 490. Embodiment 400" might also comprise a wireless transceiver, which might relay wireless communications to the LAN 465 and/or to devices (e.g., user devices 470 or the like) that are communicatively coupled to the LAN 465. The LAN 465, in some cases, might also communicatively couple to the one or more ground-based signal distribution devices 450a or 450b via NID 460a and/or ONT 460b, or might communicatively couple to one or more other Internet (or other network) sources via NID 460a and/or ONT 460b, or the like. In some instances, the user device(s) 470 might each include, but is not limited to, one of a tablet computer, a desktop computer, a laptop computer, a smart phone, a mobile phone, a portable gaming device, a remote control device, or a personal digital assistant, and/or the like.

In various embodiments, embodiment 400" might comprise one or more vehicles 420 (which in FIG. 4C are depicted as aerial drones, although the various embodiments are not so limited, as described above), one or more platforms 495 and sub-platforms 415. In some instances, as shown in the non-limiting embodiment of FIG. 4C, the one or more platforms 495 might comprise a telephone pole-based platform, a utility pole-based platform, a street-light (or lamp post) based platform, a roof-top-based platform, and/or the like. In the non-limiting embodiment of FIG. 4C, the lamp post-based platforms and the telephone/utility pole-based platform might each comprise a base portion that clamps, affixes, or otherwise attaches to a portion of one of the poles. Attached to or integrated with the base portion might be a sub-platform 415, which might comprise a recharger system, which might include, but is not limited to, an inductive charging system, a contact charging system, a battery extractor, a battery loader, a battery replacement system, fuel container replacement system (e.g., gas container replacement system, solid fuel container replacement system, liquid fuel container replacement system, etc.), and/or the like. The platforms 495 or sub-platforms 415 might further comprise one or more security or deterrent systems 495b, which might comprise a spike-based system 495a, tilt-based system 495e, or the like. In some instances, the spike-based system 495a might comprise one or more spikes that might extend to block drones 420 that are not authorized or authenticated from docking with the particular platform 495 or sub-platform 415, and/or might retract to allow authorized or authenticated drones 420 to dock with the particular platform 495 or sub-platform 415, both embodiments of which are, for example, depicted as being attached or affixed to lamp posts 490 in FIG. 4C. Alternatively, rather than spikes being raised or extended, barriers (e.g., barrier plates, barrier walls, barrier lids over contact points, and/or the like) might be deployed. In some cases, the tilt-based system 495e might comprise a hinge or other tilting system that tilts at least a portion of the base portion and/or the sub-platform 415 to prevent drones 420 that are not authorized or authenticated from docking with the particular platform 495 or sub-platform 415 (as shown in FIG. 4C, tilting the at least a portion of the base portion and/or the sub-platform 415 might cause any authorized or authenticated drones 420 that are attempting to dock with the platform 495 to slip and fall (as depicted by the downward arrow beside the drone 420). In some instances, the roof-top-based platform or sub-platform on the roof of customer premises 445 might provide similar functionality as the other platform or sub-platform.

Further regarding authentication, vehicles or drones 420 visiting a charging station (i.e., a platform 495) would authenticate with the charging station so that the charging station knows the identity of the vehicle or drone 420 (or the identity of a user or owner associated with the vehicle or drone 420). Through the authentication process, access to the drone's profile is made available to the network of charging stations or platforms 495. The profile may contain additional detail that would not need to be transferred directly between the drone and the charging station. Additionally, through authentication, prioritization may be established. For example, if there is a visiting drone that has not pre-registered with the network of charging stations, it may receive a lower priority to be serviced, or possibly be denied service, etc.

According to some embodiments, at least one platform 495 of the one or more platforms 495 might comprise one or more clamps 495c (in some cases with corresponding clamps on the drones 420) that prevent authorized or authenticated drones 420 that are docked with the at least one platform 495 from falling or slipping off the at least one platform 495, either during normal operations or during emergency situations (e.g., when the at least platform 495 is determined to be in the path of at least one of one or more weather conditions, one or more man-made disasters, or one or more natural disasters, and/or the like, where such determination might be made by the at least one platform 495, the drone docked therewith, other drones, other platforms, a remote computing system, a distributed computing system that utilizes processors in any or a combination of these devices or systems, and/or a cloud computing system, and/or the like). Merely by way of example, the one or more clamps might include, without limitation, at least one of one or more magnetic clamps, one or more electro-magnetic clamps, or one or more mechanical clamps, and/or the like. Not only do the one or more clamps 495c prevent docked drones (i.e., authorized or authenticated drones) from falling or slipping off the at least one platform 495, but the one or more clamps 495c, in some cases, may also be used as an anti-theft mechanism or deterrent that prevents theft of docked drones by criminal individuals or groups.

In some embodiments, a computing system (which might include, but is not limited to, at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system) might map two or more vehicles or drones 420, might map two or more platforms 495 or sub-platforms 415, might determine the status of each of the two or more vehicles or drones 420 based at least in part on first data corresponding to each of the two or more vehicles or drones 420 obtained through any combination of drones and platforms, might determine the status of each of the two or more platforms 495 or sub-platforms 415 based at least in part on second data corresponding to each of the two or more platforms 495 or sub-platforms 415 obtained through any combination of drones and platforms, and might coordinate movement of at least one of the two or more vehicles or drones 420 relative to at least one of the two or more platforms 495 or sub-platforms 415, based at least in part on the status of each of the two or more vehicles or drones 420 and the status of each of the two or more platforms 495 or sub-platforms 415.

For example, if a first drone 420 is determined to have depleted battery power and is authorized to dock with a nearby platform 495, but that platform 495 might currently have a second drone 420 docked therewith, the computing system might have mapped the plurality of drones and might have determined the status of each of the first and second drones as well as the status of the platform, and might coordinate movement of the first and second drones by, e.g., sending control instructions to the second drone to undock from the platform and sending control instructions to the first drone to take the place of the second drone by docking with the now vacated platform and to begin charging or replacing its batteries. The computing system might further track the amount that a user or owner associated with the first drone might be billed for the charging or replacement of the first drone's batteries. In some embodiments, the computing system might assess the condition and age of the first drone's batteries to determine if additional compensation needs to occur for the exchange of new batteries for ones that are at the end of their serviceable life. The exchange of batteries may be restricted to members of a pre-determined collective of drones or the like. Information may be recorded and read from the battery itself via RFID or the like. Tracking data can include, without limitation, age, ownership, number of charges, capacity, and/or the like. Similarly, the computing system might compensate a user or owner associated with the second drone if not fully charged and if required to continue charging or replacing its batteries after the first drone is serviced, particularly for any battery power used while hovering or otherwise waiting while the first drone is being serviced. Although this example is directed to battery status—based coordination of drones relative to platforms, the various embodiments are not so limited, and the might also be directed to, but not limited to: coordination of drones relative to platforms to expand or augment wireless network coverage using drones with onboard base stations or wireless network relay systems; coordination of drones relative to platforms to fill gaps in network coverage due to disabled, damaged, or inoperable wireless communications nodes (which might include drones, stationary base stations, telecommunications towers, network access points, etc.) using similar drones; coordination of drones relative to platforms to better monitor or track one or more of vehicular accidents, criminal activities, man-made disasters, natural disasters, real-time traffic patterns, weather conditions, missing persons, missing vehicles or drones, damaged vehicles or drones, packages for delivery, and/or the like; coordination of drones relative to platforms to repair or retrieve lost or damaged vehicles or drones, lost or damaged packages, damaged telecommunications equipment, and/or the like; coordination of drones relative to platforms to avoid restricted or dangerous areas (e.g., no-fly zones, private property, government property, disaster zones, emergency response zones, etc.); coordination of drones relative to platforms to adjust orientation, direction, or elevation of one or more drones to correct, enhance, or improve wireless communications with one or more other drones, one or more platforms, one or more user devices, and/or one or more wireless network nodes, based at least in part on status of the wireless connectivity of the one or more drones; coordination of drones relative to platforms and/or other drones to optimize, manage, or balance energy consumption by the drones; coordination of drones relative to platforms and/or other drones to optimize travel time; and/or the like. Information regarding restricted or dangerous areas might be obtained by polling federal databases, by using commercial mapping data, by searching self-learning databases, by using image recognition of particular areas near the navigation path(s), by communicating with nearby platforms, drones, and/or master controller relay devices, and/or the like.

In some embodiments, while a drone is docked with a platform or while the drone is within particular or predetermined distance from the platform, software updates, control instructions, and/or other information can be pushed to the drone via the platform. Similarly, in such situations, information (e.g., status information, video data (if any), audio data (if any), location log data (if any), and/or the like) can be sent from the drones to a computing system via the platform.

The one or more vehicles or drones 420, the one or more platforms 405, 435, and 495 (or sub-platform 415), and the one or more ground-based signal distribution devices 450*a* or 450*b* of embodiments 400, 400', and 400" of FIG. 4 might otherwise be the same as, or similar to, the one or more vehicles 105, the one or more platforms 120, and the one or more wireless network nodes 135, respectively, of system 100 of FIG. 1, and similar descriptions apply to the components of embodiments 400, 400', and 400" of FIG. 4.

Figure 5:
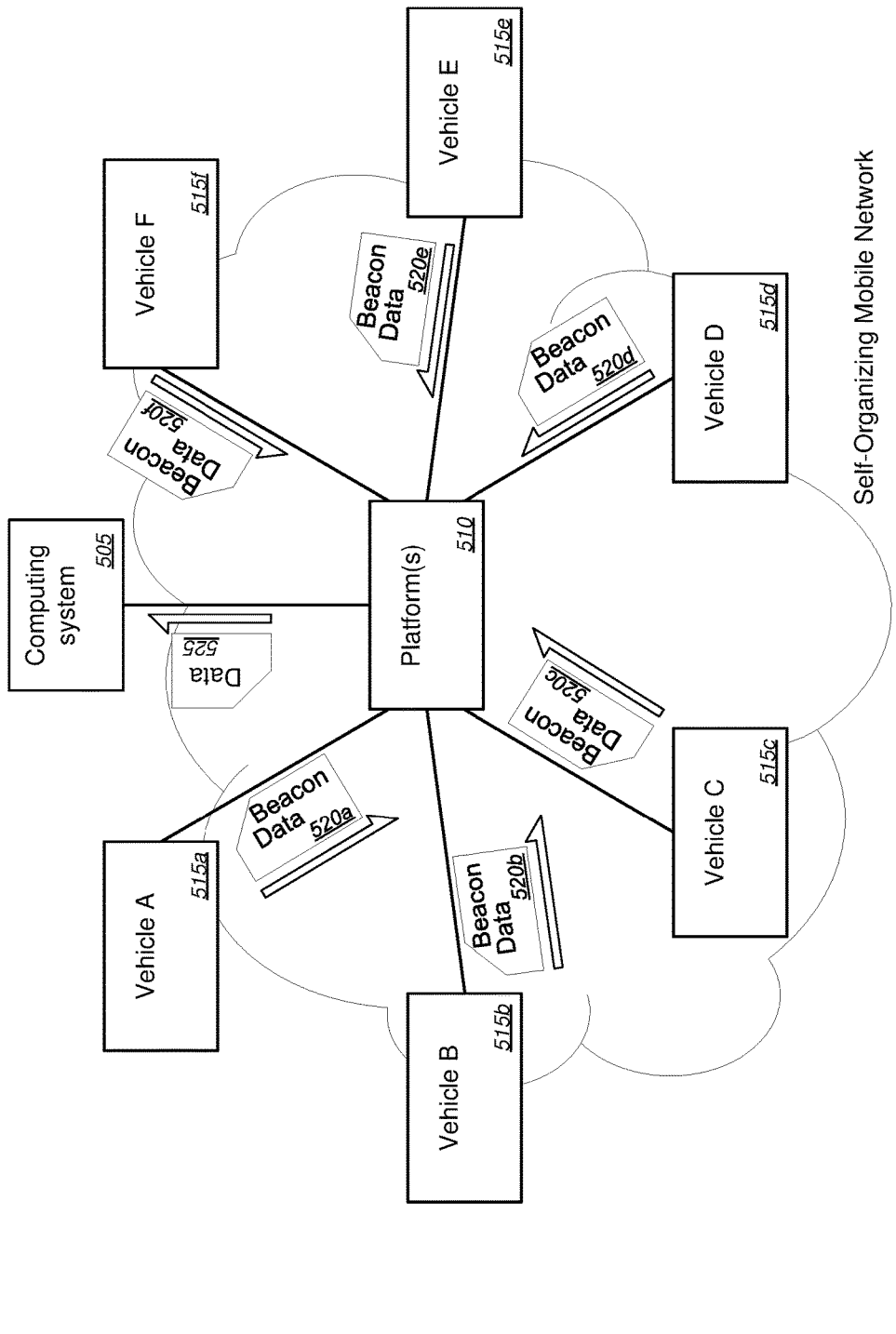
FIG. 5 is a schematic diagram illustrating a non-limiting embodiment of a self-organizing mobile network of drones and platforms.

FIG. 5 is a schematic diagram illustrating a non-limiting embodiment 500 of a self-organizing mobile network ("SOMNET") of drones and platforms. The SOMNET 500 of drones and platforms changes over time as drones move beyond the range of the components in the SOMNET 500, as drones and/or platforms experience device failure, as drones and/or platforms become disabled, as new drones (i.e., drones not previously part of the SOMNET, etc.) join the SOMNET 500, as new platforms (i.e., platforms not previously part of the SOMNET, etc.) join the SOMNET 500, or any combination of these occurrences, and/or the like. In other cases With reference to FIG. 5, SON 500, in accordance with a set of non-limiting embodiments, might comprise computing system 505, one or more platforms 510, and vehicles A through F 515*a*-515*f* (collectively, "vehicles 515," "drones 515," "devices 515," and/or the like), and/or the like. Periodically, occasionally, as part of a tack, or upon request, and/or the like, the vehicles A through F 515*a*-515*f* each might send beacon data 520*a*-520*f* (collectively, "beacon data 520" or "data 520," or the like), respectively, to at least one platform of the one or more platforms 510 or might generally broadcast the beacon data 520, which might be received by the at least one platform 510 (either directly or via one or more of the other vehicles 515). The beacon data 520, according to some embodiments, might include, without limitation, at least one of a unique identifier assigned to a particular one of the vehicles A through F 515*a*-515*f*, signal strength or transmission power level of the beacon data, current battery level of the particular one of the vehicles A through F 515*a*-515*f*, remaining battery level of the particular one of the vehicles A through F 515*a*-515*f*, geographic location information of the particular one of the vehicles A through F 515*a*-515*f*, relative location information of the particular one of the vehicles A through F 515*a*-515*f* with respect to other vehicles 515, communication transmission power level, or configuration parameters, and/or the like. In some cases, the unique identifier assigned to a particular one of the vehicles 515 might include, but is not limited to, identifiers that are at least one of Internet Protocol ("IP")—based (e.g., a unique IPv6 identifier, or the like), location based, or media access control identification ("MAC ID")—based, and/or the like.

In some embodiments, the at least one platform 510 might autonomously compare the received beacon data 520 with stored beacon data (i.e., beacon data that is stored in a data store of the at least one platform 510, such as data store 210*c* of FIG. 2, or the like), and might determine whether the received beacon data differs from the stored beacon data (which might indicate whether a new vehicle is detected, whether a previously known vehicle has failed, whether a previously known vehicle has been disabled, whether a previously known vehicle has moved out of range, whether a new platform is detected, whether a previously known platform has failed, whether a previously known platform has been disabled, and/or the like). Based on a determination that the received beacon data differs from the stored beacon data, the at least one platform 510 might autonomously send at least one first data 525 to computing system 505 (which might correspond to computing system(s) 145 and 295 of FIGS. 1 and 2, or the like), or might otherwise update the computing system 505 with information regarding the nodes or components (i.e., vehicles 515 and/or platforms 510, or the like) in the SOMNET 500 (e.g., based at least in part on the beacon data 520, the stored beacon data, and/or the like), or the like. The at least one first data 525 might comprise data regarding the vehicles 515*a*-515*f* and/or regarding any new vehicles, any previously known vehicles that have now failed, any previously known vehicles have now been disabled, any previously known vehicles have now moved out of range, data regarding the one or more platforms 510 and/or regarding any new platforms, any previously known platforms that have now failed, any previously known platforms that have now been disabled, and/or the like. In some cases, the received beacon data 525*a*-525*f* might replace the stored beacon data. Alternatively, any received beacon data 525 might be time stamped and saved with previously received and time-stamped beacon data 525. The beacon data 525 might either be backed up at a database (e.g., database(s) 150 of FIG. 1, or the like), and/or the oldest set of beacon data 525 (i.e., at the earliest stored time period) might be deleted so that the latest set of beacon data 525 (i.e., at the current time period) can be saved in the local data store (in such cases, a predetermined number of sets of beacon data at their respective time periods as time stamped can be saved in the local data store, subject to change in number due to remaining storage space in the local data store and due to the number of vehicles and/or platforms potentially increasing or decreasing at different time periods).

Although platform(s) 510 is shown in FIG. 5 as transmitting or relaying data 525 directly to computing system 505, the various embodiments are not so limited, and intermediary network devices or other devices might relay data 525 between platform(s) 510 and computing system 505. Further, although platform(s) 510 is shown in FIG. 5 as collecting beacon data 520 from vehicles 515 and sending data 525 based on the collected beacon data 520 or based on updated/modified beacon data 520 (as described above), the various embodiments are not so limited, and any one (or more) of the vehicles 515 might collect beacon data 520 from other vehicles 515 (and in some cases, from platforms 510 as well), and might send data 525 based on the collected beacon data 520 or based on updated/modified beacon data 520 (in a similar manner as described above).

The one or more vehicles or drones 515a-515f, the one or more platforms 510, and the computing system 505 of SOMNET 500 of FIG. 5 might otherwise be the same as, or similar to, the one or more vehicles 105, the one or more platforms 120, and the one or more computing systems 145, respectively, of system 100 of FIG. 1, and similar descriptions apply to the components of system 500 of FIG. 5.

FIGS. 6A-6H (collectively, "FIG. 6") are flow diagrams illustrating a method 600 for implementing SOMNETs of drones, in accordance with various embodiments.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems or embodiments 100, 200, 300, 400, 400', 400", and 500 of FIGS. 1, 2, 3, 4A, 4B, 4C, and 5, respectively (or components thereof), such methods may also be implemented using any suitable hardware (or software) implementation. Similarly, while each of the systems or embodiments 100, 200, 300, 400, 400', 400", and 500 of FIGS. 1, 2, 3, 4A, 4B, 4C, and 5, respectively (or components thereof), can operate according to the method 600 illustrated by FIG. 6 (e.g., by executing instructions embodied on a computer readable medium), the systems or embodiments 100, 200, 300, 400, 400', 400", and 500 of FIGS. 1, 2, 3, 4A, 4B, 4C, and 5 can each also operate according to other modes of operation and/or perform other suitable procedures.

Figure 6A:
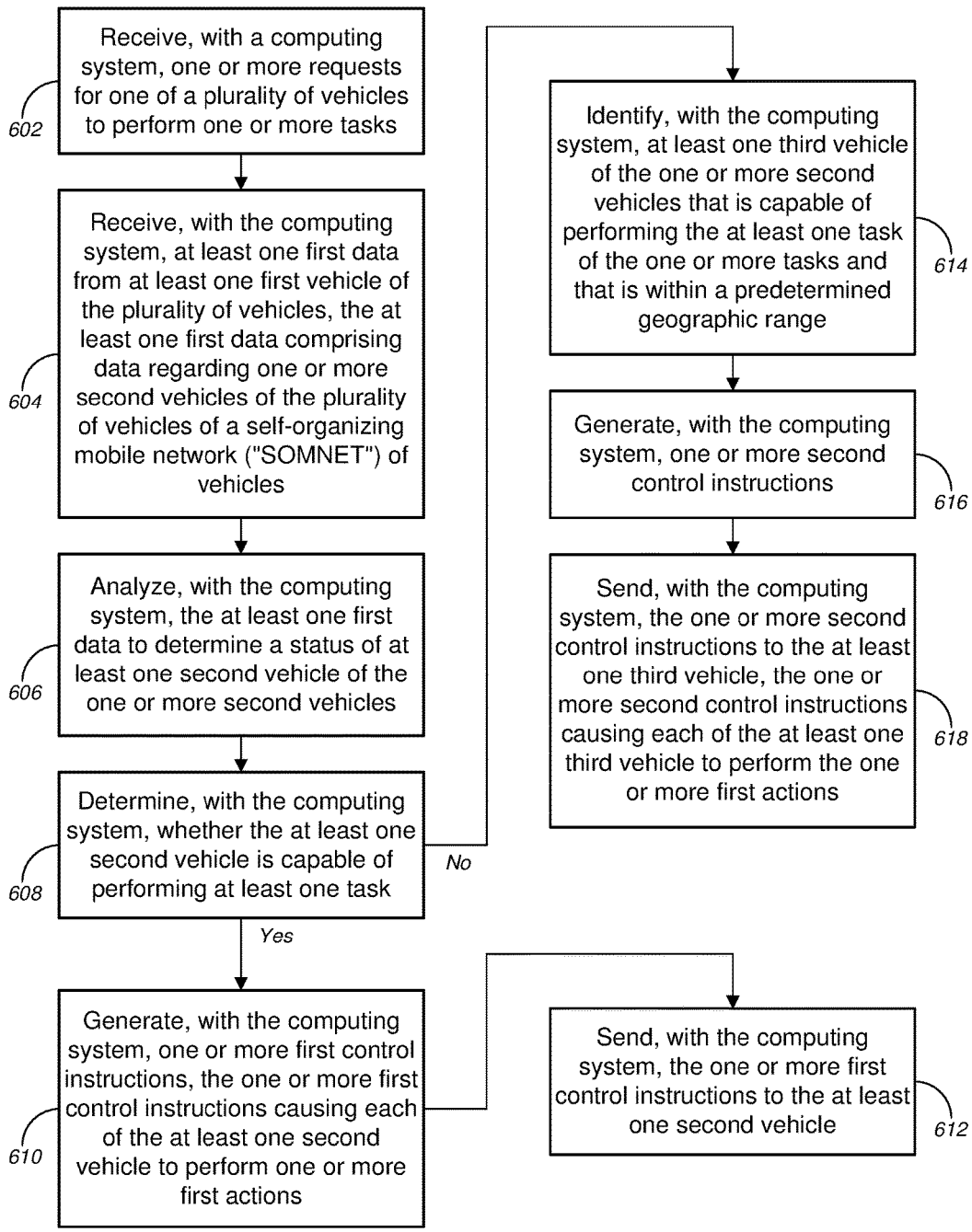

In the non-limiting embodiment of FIG. 6A, method 600 might comprise receiving, with a computing system, one or more requests for one of a plurality of vehicles to perform one or more tasks (block 602); receiving, with the computing system, at least one first data from at least one first vehicle of the plurality of vehicles, the at least one first data comprising data regarding one or more second vehicles of the plurality of vehicles of a self-organizing mobile network ("SOMNET") of vehicles (block 604); and analyzing, with the computing system, the at least one first data to determine a status of at least one second vehicle of the one or more second vehicles (block 606). Method 600, at block 608, might further comprise determining, with the computing system, whether the at least one second vehicle is capable of performing at least one task of the one or more. If so, method 700 might proceed to the process at block 610. If not, method 700 might proceed to the process at block 614.

In response to receiving the one or more requests and based at least in part on a determination that the at least one second vehicle is capable of performing at least one task of the one or more tasks (as determined at block 608), generating, with the computing system, one or more first control instructions (block 610) and sending, with the computing system, the one or more first control instructions to the at least one second vehicle (block 612). The one or more first control instructions might cause each of the at least one second vehicle to perform one or more first actions.

Alternatively, in response to receiving the one or more requests and based at least in part on a determination that the at least one second vehicle is unable to perform the at least one task of the one or more tasks (as determined at block 608), identifying, with the computing system, at least one third vehicle of the one or more second vehicles that is capable of performing the at least one task of the one or more tasks and that is within a predetermined geographic range (block 614); generating, with the computing system, one or more second control instructions (block 616); and sending, with the computing system, the one or more second control instructions to the at least one third vehicle, the one or more second control instructions causing each of the at least one third vehicle to perform the one or more first actions (block 618). In some instances, the one or more second vehicles might comprise the first vehicle (in some cases, the first vehicle and at least one of the second vehicles might be the same vehicle).

In some embodiments, the computing system might include, without limitation, at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system, and/or the like. In some cases, each of the plurality of vehicles might comprise one of a manned vehicle or an unmanned vehicle. Each manned vehicle might include, but is not limited to, one of a car, a motorcycle, an all-terrain vehicle, a truck, a van, a semi-trailer truck, an aircraft, a subterranean vehicle, an amphibious vehicle, or a water craft, and/or the like. Each unmanned vehicle might include, without limitation, one of an aerial drone, a land-based drone, a water-based drone, a subterranean drone, an amphibious drone, a robot, or an autonomous vehicle, and/or the like.

In some cases, at least one vehicle of the plurality of vehicles might comprise an inductive charging system that charges via inductive power transfer from one or more charging pads in a corresponding charging platform with which the at least one vehicle docks. In some instances, the determined status of the at least one second vehicle might include, without limitation, one of current battery charge level, remaining battery charge level, current geographic location, one or more currently plotted destinations, one or more currently plotted courses, proximity to one or more charging platforms, proximity to one or more communications platforms, proximity to one or more nearby vehicles, communications status with one or more nearby vehicles, new device status within the SOMNET, registration status within the SOMNET, availability to perform at least one of the one or more tasks, status of current task, status of one or more onboard tools, device failure status, disabled device status, or out-of-range device status, and/or the like.

Merely by way of example, at least one first vehicle of the plurality of vehicles might each receive beacon data from each of at least one second vehicle of the one or more second vehicles. The data regarding the one or more second vehicles might comprise the beacon data from each of the at least one second vehicle. In some cases, the beacon data from each of the at least one second vehicle might include, but is not limited to, at least one of a unique identifier assigned to a particular one of the at least one second vehicle, signal strength of the beacon data, current battery level of the at least one second vehicle, remaining battery level of the at least one second vehicle, geographic location information of the particular one of the at least one second vehicle, relative location information of the particular one of the at least one second vehicle with respect to other vehicles, communication transmit power level, or configuration parameters, and/or the like.

According to some embodiments, the one or more first actions might include, without limitation, at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment, and/or the like. In some embodiments, wireless base stations that might be used in conjunction with the various embodiments might include, but are not limited to, a base station that is integrated with a vehicle (e.g., the built-in mobile wireless base station described above, which might have a way to provide a backhaul link to a database or might contain a built-in database), a base station that is portable but functions as a stationary wireless base station once deployed (e.g., similar to a cell on wheels ("COW") or the like), a base station that is permanently deployed at a stationary geographic location, a base station that is used as an extender or repeater, and/or the like. In some cases, the permanent wireless network node or base station might be part of either a wireless network service provider or a wireline network service provider. A small cell could be attached to wireline access equipment. In some instances, portions of the permanent wireless network node could be virtualized (either centralized or distributed), or the like.

With reference to FIG. 6B, the one or more second vehicles might each comprise at least one of a vehicle or a drone, or the like, and each of the one or more second vehicles might comprise a mobile wireless base station. Method 600 might further comprise deploying, with the computing system, the one or more second vehicles to at least one geographic area to extend a wireless range of a telecommunications network (block 620); and establishing, with the computing system, wireless network communications between the mobile wireless base station and at least one wireless network node of the telecommunications network (block 622).

Referring to FIG. 6C, the one or more second vehicles might each comprise at least one of a vehicle or a drone, and/or the like. Each of the one or more second vehicles might comprise one or more weather sensors including, without limitation, at least one of one or more pressure sensors, one or more temperature sensors, one or more motion sensors, one or more solar light sensors, one or more ambient light sensors, one or more infra-red sensors, one or more ultra-violet sensors, one or more sound sensors, one or more seismic sensors, one or more air quality sensors, one or more moisture sensors, one or more wind sensors, or one or more particulate sensors, and/or the like. Method 600 might further comprise tracking, with the one or more weather sensors, weather conditions in one or more geographic areas (block 624); receiving, with the computing system, data from the one or more weather sensors tracking the weather conditions in the one or more geographic areas (block 626); and sending, with the computing system, one or more messages to at least one of one or more user devices associated with customers in the one or more geographic areas, one or more law enforcement agencies, one or more emergency response agencies, or one or more federal agencies, based at least in part on the received data from the one or more weather sensors (block 628).

Turning to FIG. 6D, the one or more second vehicles might each comprise at least one of a vehicle or a drone, or the like. Each of the one or more second vehicles might comprise at least one of one or more cameras or one or more microphones, and/or the like. Method 600 might further comprise monitoring, with the at least one of one or more cameras or one or more microphones, at least one of one or more vehicular accidents, one or more criminal activities, one or more man-made disasters, or one or more natural disasters (block 630); receiving, with the computing system, at least one of video or audio content from the monitored at least one of one or more vehicular accidents, one or more criminal activities, one or more man-made disasters, or one or more natural disasters (block 632); and sending, with the computing system, one or more messages to at least one of one or more law enforcement agencies, one or more emergency response agencies, one or more towing service companies, or one or more federal agencies, based at least in part on the received at least one video or audio content (block 634).

Regarding FIG. 6E, the one or more second vehicles each comprises at least one of a vehicle or a drone, and/or the like. Method 600 might further comprise determining, with the computing system and based at least in part on the status of the at least one second vehicle of the one or more second vehicles, whether at least one fourth vehicle of the one or more second vehicles is at least one of disabled, damaged, or inoperable (block 636); determining, with the computing system, a location of the at least one fourth vehicle that has been determined to be at least one of disabled, damaged, or inoperable (block 638); deploying, with the computing system, at least one fifth vehicle of the one or more second vehicles to the location of the at least one fourth vehicle that has been determined to be at least one of disabled, damaged, or inoperable (block 640); and determining, with the computing system, whether the at least one fourth vehicle is capable of being repaired on-site (block 642). Based on a determination that the at least one fourth vehicle is capable of being repaired on-site (as determined at block 642), repairing, using one or more repair tools of the at least one fifth vehicle, the at least one fourth vehicle (block 644). Alternatively, based on a determination that the at least one fourth vehicle is incapable of being repaired on-site (as determined at block 642), retrieving, using one or more retrieval tools of the at least one fifth vehicle, the at least one fourth vehicle and transporting the at least one fourth vehicle to a repair facility (block 646).

With reference to FIG. 6F, the one or more second vehicles might each comprise at least one of a vehicle or a drone, and/or the like. Method 600 might further comprise retrieving, using one or more package delivery tools of the one or more second vehicles, one or more packages (block 648); deploying, with the computing system, the one or more second vehicles to one or more customer locations with the retrieved one or more packages (block 650); and delivering, with the one or more second vehicles, each of the retrieved one or more packages to a corresponding one of the one or more customer locations (block 652). In some embodiments, the one or more customer locations might include, without limitation, at least one of one or more customer premises, one or more parked customer vehicles, one or more moving customer vehicles, one or more current locations of a user device associated with a recipient of at least one of the one or more packages, one or more anticipated locations of a user device associated with a recipient of at least one of the one or more packages, or one or more designated delivery locations, and/or the like.

Referring to FIG. 6G, the one or more second vehicles might each comprise at least one of a vehicle or a drone, and/or the like. Each of the one or more second vehicles might comprise at least one of one or more cameras or one or more microphones, and/or the like. Method 600 might further comprise monitoring, with the at least one of one or more cameras or one or more microphones, at least one package being delivered to one or more customer locations (block 654); receiving, with the computing system, at least one of video or audio content from the monitored at least one package being delivered to the one or more customer locations (block 656); and sending, with the computing system, one or more messages to at least one of one or more user devices associated with customers who are located at the one or more customer locations, one or more devices associated with a service provider deploying the one or more second vehicles, one or more devices associated with a delivery company delivering the at least one package, or one or more devices associated with one or more merchants who sold the at least one package to the customers, and/or the like (block 658). According to some embodiments, the one or more customer locations might include, but are not limited to, at least one of one or more customer premises, one or more parked customer vehicles, one or more moving customer vehicles, or one or more designated delivery locations, and/or the like. According to some embodiments, the one or more messages that are sent might include, without limitation, a delivery notification notifying the recipient of an approximate arrival time and location so the recipient can be present during delivery, a delivery notification including an option for the recipient to reschedule delivery, and/or the like. In some cases, the one or more messages might take the form of a voicemail message, a short message service ("SMS") message, a text message, an e-mail message, a combination of such messages, and/or the like.

Figure 6H:
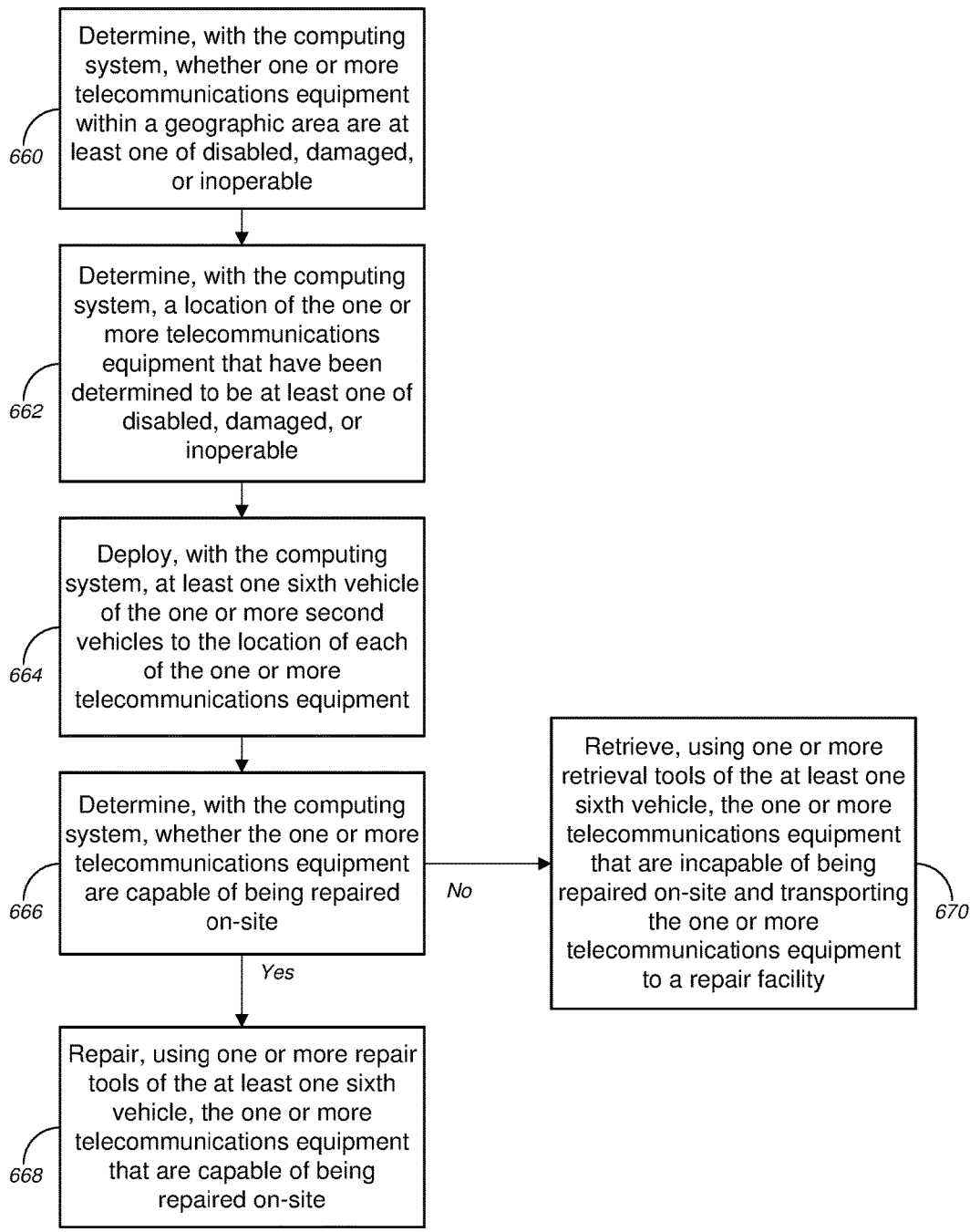

Turning to FIG. 6H, the one or more second vehicles might each comprise at least one of a vehicle or a drone, and/or the like. Method 600 might further comprise determining, with the computing system, whether one or more telecommunications equipment within a geographic area are at least one of disabled, damaged, or inoperable (block 660); determining, with the computing system, a location of the one or more telecommunications equipment that have been determined to be at least one of disabled, damaged, or inoperable (block 662); deploying, with the computing system, at least one sixth vehicle of the one or more second vehicles to the location of each of the one or more telecommunications equipment that have been determined to be at least one of disabled, damaged, or inoperable (block 664); and determining, with the computing system, whether the one or more telecommunications equipment are capable of being repaired on-site (block 666). Based on a determination that at least one of the one or more telecommunications equipment are capable of being repaired on-site (as determined at block 666), repairing, using one or more repair tools of the at least one sixth vehicle, the at least one of the one or more telecommunications equipment that are capable of being repaired on-site (block 668). Alternatively, based on a determination that at least one of the one or more telecommunications equipment are incapable of being repaired on-site (as determined at block 666), retrieving, using one or more retrieval tools of the at least one sixth vehicle, the at least one of the one or more telecommunications equipment that are incapable of being repaired on-site and transporting the at least one of the one or more telecommunications equipment to a repair facility (block 670).

FIGS. 7A-7D (collectively, "FIG. 7") are flow diagrams illustrating a method 700 for implementing SOMNETs of drones and platforms, in accordance with various embodiments.

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems or embodiments 100, 200, 300, 400, 400', 400", and 500 of FIGS. 1, 2, 3, 4A, 4B, 4C, and 5, respectively (or components thereof), such methods may also be implemented using any suitable hardware (or software) implementation. Similarly, while each of the systems or embodiments 100, 200, 300, 400, 400', 400", and 500 of FIGS. 1, 2, 3, 4A, 4B, 4C, and 5, respectively (or components thereof), can operate according to the method 700 illustrated by FIG. 7 (e.g., by executing instructions embodied on a computer readable medium), the systems or embodiments 100, 200, 300, 400, 400', 400", and 500 of FIGS. 1, 2, 3, 4A, 4B, 4C, and 5 can each also operate according to other modes of operation and/or perform other suitable procedures.

Figure 7A:
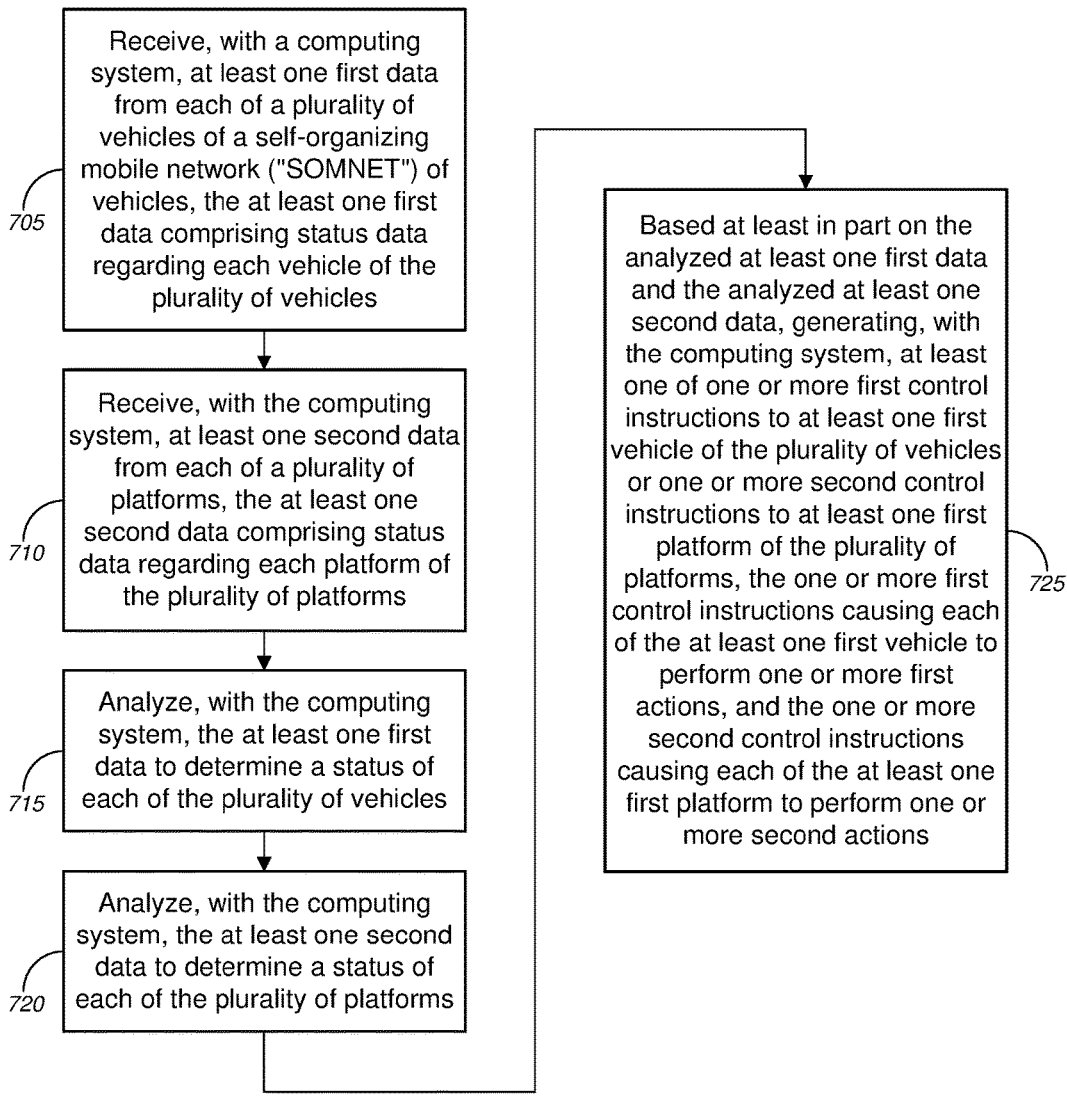

In the non-limiting embodiment of FIG. 7A, method 700 might comprise receiving, with a computing system, at least one first data from each of a plurality of vehicles of a self-organizing mobile network ("SOMNET") of vehicles. The at least one first data might comprise status data regarding each vehicle of the plurality of vehicles (block 705). At block 710, method 700 might comprise receiving, with the computing system, at least one second data from each of a plurality of platforms. The at least one second data might comprise status data regarding each platform of the plurality of platforms. Method 700 might further comprise analyzing, with the computing system, the at least one first data to determine a status of each of the plurality of vehicles (block 715) and analyzing, with the computing system, the at least one second data to determine a status of each of the plurality of platforms (block 720).

Method 700 might comprise, at block 725, based at least in part on the analyzed at least one first data and the analyzed at least one second data, generating, with the computing system, at least one of one or more first control instructions to at least one first vehicle of the plurality of vehicles or one or more second control instructions to at least one first platform of the plurality of platforms. The one or more first control instructions might cause each of the at least one first vehicle to perform one or more first actions, while the one or more second control instructions might cause each of the at least one first platform to perform one or more second actions.

In some embodiments, the computing system might include, without limitation, at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system, and/or the like. In some cases, each of the plurality of vehicles might comprise one of a manned vehicle or an unmanned vehicle. Each manned vehicle might include, but is not limited to, one of a car, a motorcycle, an all-terrain vehicle, a truck, a van, a semi-trailer truck, an aircraft, a subterranean vehicle, an amphibious vehicle, or a water craft, and/or the like. Each unmanned vehicle might include, without limitation, one of an aerial drone, a land-based drone, a water-based drone, a subterranean drone, an amphibious drone, a robot, or an autonomous vehicle, and/or the like.

According to some embodiments, each of the plurality of platforms might comprise one of a stationary platform or a mobile platform. In some instances, each stationary platform might include, but is not limited to, one of a telephone pole-based platform, a utility pole-based platform, a tower-based platform, a buoy-based platform, a hangar-based platform, a building-based platform, or a pedestal-based platform, and/or the like. Each mobile platform might include, without limitation, one of a cargo-trailer-based platform, a cargo-container-based platform, a van-based platform, a truck-based platform, an aircraft-based platform, a train-based platform, or a boat-based platform, and/or the like.

In some cases, at least one vehicle of the plurality of vehicles might comprise an inductive charging system that charges via inductive power transfer from one or more charging pads in a corresponding charging platform with which the at least one vehicle docks. In some instances, the determined status of the at least one second vehicle might include, without limitation, one of current battery charge level, remaining battery charge level, current geographic location, one or more currently plotted destinations, one or more currently plotted courses, proximity to one or more charging platforms, proximity to one or more communications platforms, proximity to one or more nearby vehicles, communications status with one or more nearby vehicles, new device status within the SOMNET, registration status within the SOMNET, availability to perform at least one of the one or more tasks, status of current task, status of one or more onboard tools, device failure status, disabled device status, or out-of-range device status, and/or the like.

Merely by way of example, at least one second vehicle of the plurality of vehicles might each receive beacon data from at least one third vehicle of the plurality of vehicles. The data regarding the at least one third vehicle might comprise the beacon data from each of the at least one third vehicle. In some cases, the beacon data from each of the at least one third vehicle might include, but is not limited to, at least one of a unique identifier assigned to a particular one of the at least one third vehicle, signal strength of the beacon data, current battery level of the at least one third vehicle, remaining battery level of the at least one third vehicle, geographic location information of the particular one of the at least one third vehicle, relative location information of the particular one of the at least one third vehicle with respect to other vehicles, communication transmit power level, or configuration parameters, and/or the like.

According to some embodiments, the one or more first actions might include, without limitation, at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment, and/or the like.

In some embodiments, the one or more second actions might include, but are not limited to, at least one of controlling one or more vehicles of the plurality of vehicles to travel within a geographic area, controlling a vehicle of the plurality of vehicles to dock with one or more of the plurality of platforms, rerouting one or more vehicles of the plurality of vehicles along one or more alternative paths, rerouting one or more vehicles of the plurality of vehicles to avoid no-fly-zones, recharging a vehicle docked with one of the plurality of platforms, replacing at least one battery of a vehicle docked with one of the plurality of platforms with at least one replacement battery, installing at least one tool on a vehicle docked with one of the plurality of platforms, replacing at least one tool of a vehicle docked with one of the plurality of platforms with at least one replacement tool, repairing one of the plurality of vehicles docked with one of the plurality of platforms, preventing docking by unauthorized vehicles, remotely disabling one or more vehicles of the plurality of vehicles, pushing one or more software updates to one of the plurality of vehicles docked with one of the plurality of platforms, broadcasting platform resource information to one or more of the plurality of vehicles, establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, or tracking one or more packages being delivered, and/or the like. In some cases, the platform resource information might include, without limitation, at least one of resources available at a particular broadcasting platform, capabilities of a particular broadcasting platform, profiles of a particular broadcasting platform, rates of services provided by a particular broadcasting platform, or types of batteries available at a particular broadcasting platform, and/or the like.

With reference to FIG. 7B, method 700 might further comprise determining, with the computing system, whether a fourth vehicle of the plurality of vehicles is unauthorized to dock with at least one first platform of the plurality of platforms (block 730); and based on a determination that the fourth vehicle is unauthorized to dock with the at least one first platform, preventing, with the computing system, docking by the unauthorized fourth vehicle, by performing one of rerouting the fourth vehicle away from the at least one first platform, tilting one or more docking portions of the at least one first platform avoid docking by the fourth vehicle, or raising one or more blocking spikes (or deploying one or more barriers) to prevent docking by the fourth vehicle, and/or the like (block 735).

Referring to FIG. 7C, method 700 might further comprise tracking, with the computing system, at least one of one or more weather conditions, one or more man-made disasters, or one or more natural disasters, and/or the like (block 740); and determining, with the computing system, whether at least one second platform of the plurality of platforms is in the path of the at least one of one or more weather conditions, one or more man-made disasters, or one or more natural disasters, and/or the like (block 745). At block 750, method 700 might comprise, based on a determination that the at least one second platform of the plurality of platforms is in the path of the at least one of one or more weather conditions, one or more man-made disasters, or one or more natural disasters, and/or the like, and based on a determination that a fifth vehicle of the plurality of vehicles is currently docked with the at least one second platform, engaging, with the computing system, one or more clamps to secure the at least one fifth vehicle to the at least one second platform. The one or more clamps might include, without limitation, at least one of one or more magnetic clamps, one or more electro-magnetic clamps, or one or more mechanical clamps, and/or the like.

Figure 7D:
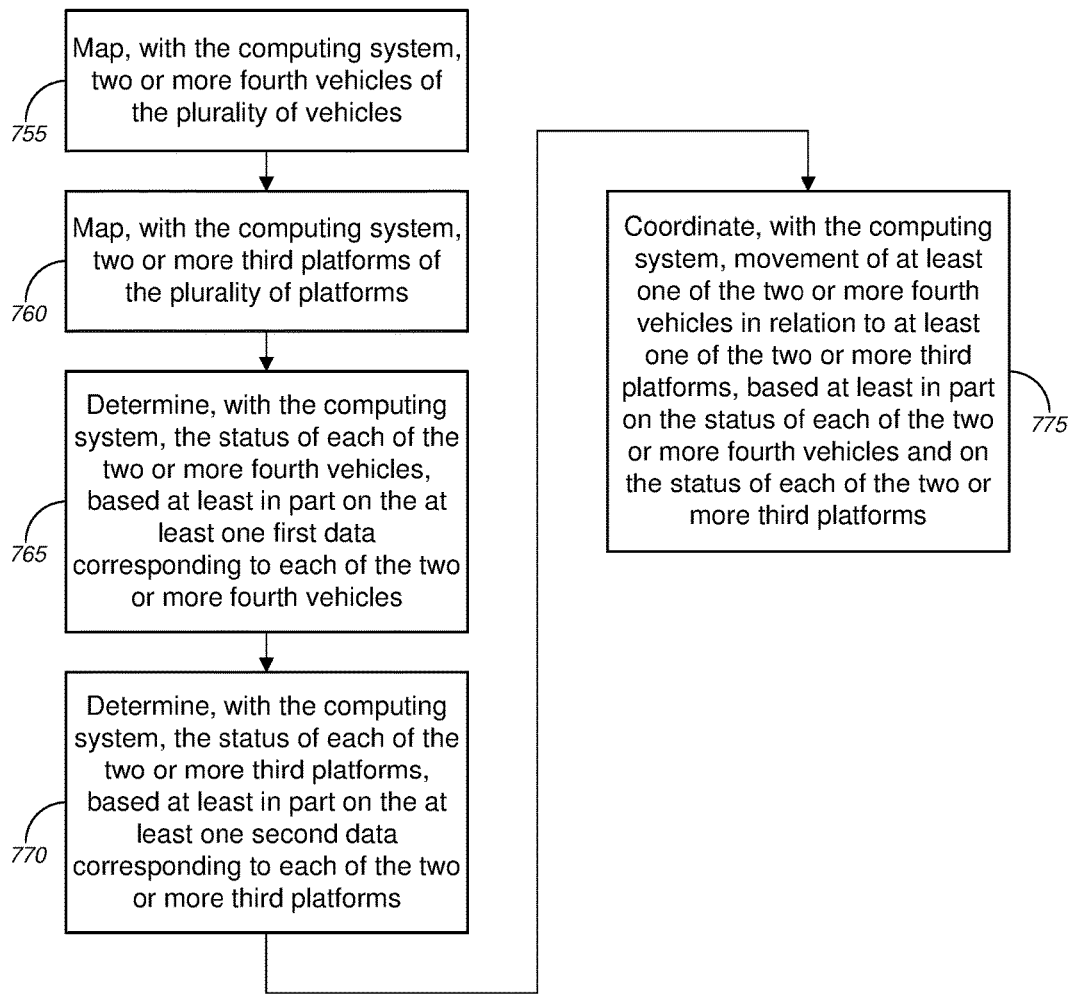

Turning to FIG. 7D, method 700 might further comprise mapping, with the computing system, two or more sixth vehicles of the plurality of vehicles (block 755); mapping, with the computing system, two or more third platforms of the plurality of platforms (block 760); determining, with the computing system, the status of each of the two or more sixth vehicles, based at least in part on the at least one first data corresponding to each of the two or more sixth vehicles (block 765); determining, with the computing system, the status of each of the two or more third platforms, based at least in part on the at least one second data corresponding to each of the two or more third platforms (block 770); and coordinating, with the computing system, movement of at least one of the two or more sixth vehicles in relation to at least one of the two or more third platforms, based at least in part on the status of each of the two or more sixth vehicles and on the status of each of the two or more third platforms (block 775).

Exemplary System and Hardware Implementation

Figure 8:
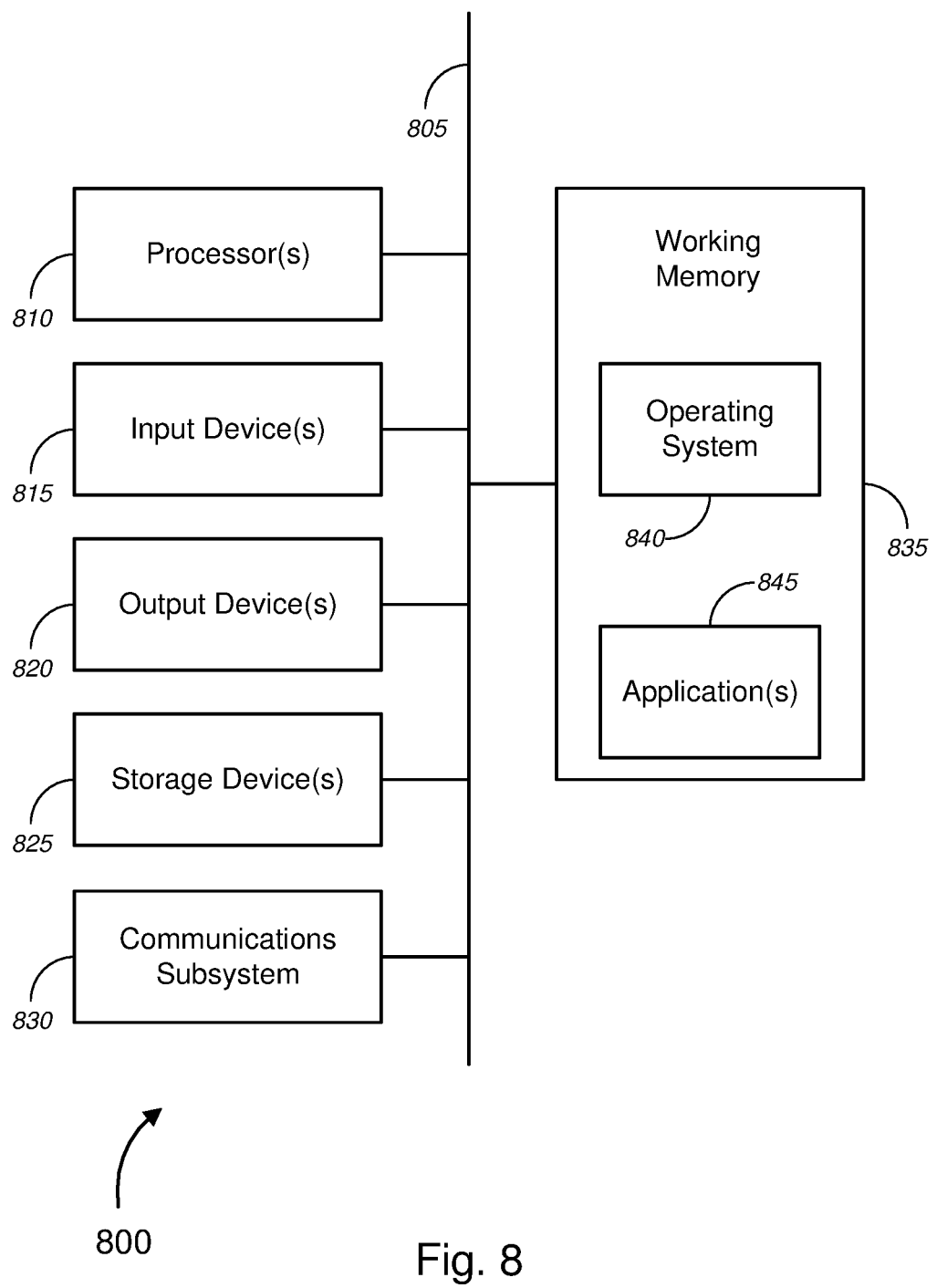
FIG. 8 is a block diagram illustrating an exemplary computer or system hardware architecture, in accordance with various embodiments.

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of computer or hardware system (i.e., vehicles 105, 110*a*-110*n*, 115*a*-115*n*, 205, 320, 420, and 515*a*-515*f*, platforms 120*a*-120*n*, 210, 325, 405, 435, 495, and 510, user devices 125*a*-125*n* and 285, wireless network nodes 135, 290, and 330, and computing system(s) 145, 295, and 505, etc.), as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the computer or hardware system (i.e., vehicles 105, 110*a*-110*n*, 115*a*-115*n*, 205, 320, 420, and 515*a*-515*f*, platforms 120*a*-120*n*, 210, 325, 405, 435, 495, and 510, user devices 125*a*-125*n* and 285, wireless network nodes 135, 290, and 330, and computing system(s) 145, 295, and 505, etc.), described above with respect to FIGS. 1-7—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and/or the like); one or more input devices 815, which can include, without limitation, a mouse, a keyboard and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
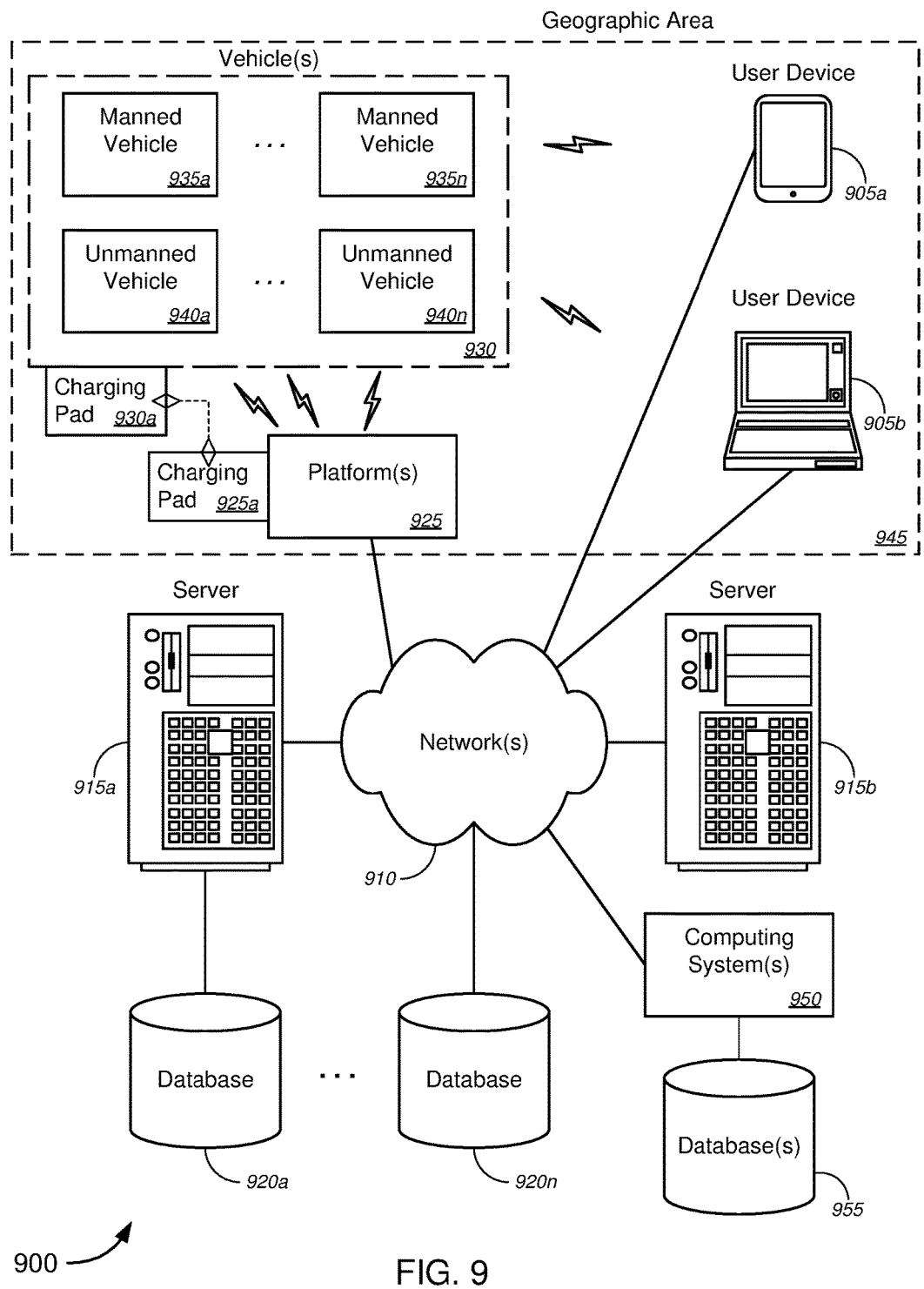
FIG. 9 is a block diagram illustrating a networked system of computers, computing systems, or system hardware architecture, which can be used in accordance with various embodiments.

As noted above, a set of embodiments comprises methods and systems for implementing wireless communications and self-organizing networks ("SONs"), and, more particularly, to methods, systems, and apparatuses for implementing self-organizing mobile networks ("SOMNETs") of drones and platforms. FIG. 9 illustrates a schematic diagram of a system 900 that can be used in accordance with one set of embodiments. The system 900 can include one or more user computers, user devices, or customer devices 905. A user computer, user device, or customer device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 905 can also have any of a variety of applications, including one or more applications configured to perform methods provided by various embodiments (as described above, for example), as well as one or more office applications, database client and/or server applications, and/or web browser applications. Alternatively, a user computer, user device, or customer device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers, user devices, or customer devices 905, any number of user computers, user devices, or customer devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 910 (similar to network(s) 160 in FIGS. 1 and 260 in FIG. 2, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 905 and/or another server 915. In some embodiments, an application server can perform one or more of the processes for implementing wireless communications and self-organizing networks ("SONs"), and, more particularly, to methods, systems, and apparatuses for implementing self-organizing mobile networks ("SOMNETs") of drones and platforms, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer, user device, or customer device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920a-920n (collectively, "databases 920"). The location of each of the databases 920 is discretionary: merely by way of example, a database 920a might reside on a storage medium local to (and/or resident in) a server 915a (and/or a user computer, user device, or customer device 905). Alternatively, a database 920n can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise platform(s) 925, one or more vehicle(s) 930 (which comprises one or more manned vehicles 935a-935n (collectively, "manned vehicles 935" or the like), one or more unmanned vehicles 940a-940n (collectively, "unmanned vehicles 940" or the like)), some or all of which (together with user devices 905a or 905b) might be disposed within or might be deployed to geographic area 945. System 900 might further comprise computing system 950 and corresponding database(s) 955. In some embodiments, each of the one or more vehicles might comprise one of a manned vehicle or an unmanned vehicle, and/or the like. In some cases, each manned vehicle might comprise one of a car, a motorcycle, an all-terrain vehicle, a truck, a van, a semi-trailer truck, an aircraft, a subterranean vehicle, an amphibious vehicle, or a water craft, and/or the like. In some instances, each unmanned vehicle might comprise one of an aerial drone, a land-based drone, a water-based drone, a subterranean drone, an amphibious drone, a robot, or an autonomous vehicle, and/or the like. According to some embodiments, each of the one or more user devices might comprise one of a laptop computer, a tablet computer, a smart phone, a mobile phone, a personal digital assistant, a set-top box, a video recording or playback device, an audio recording or playback device, or a portable gaming device, and/or the like.

In operation, at least one of server(s) 915, platform(s) 925, at least one manned vehicle 935, at least one unmanned 940, and/or computing system(s) 950 might receive one or more requests for one of a plurality of vehicles to perform one or more tasks; might receive at least one first data from at least one first vehicle of the plurality of vehicles, the at least one first data comprising data regarding one or more second vehicles of the plurality of vehicles of a self-organizing mobile network ("SOMNET") of vehicles;

and might analyze the at least one first data to determine a status of at least one second vehicle of the one or more second vehicles.

In response to receiving the one or more requests and based at least in part on a determination that the at least one second vehicle is capable of performing at least one task of the one or more tasks, the at least one of server(s) 915, platform(s) 925, at least one manned vehicle 935, at least one unmanned 940, and/or computing system(s) 950 might generate one or more first control instructions and might send the one or more first control instructions to the at least one second vehicle, the one or more first control instructions causing each of the at least one second vehicle to perform one or more first actions. In response to receiving the one or more requests and based at least in part on a determination that the at least one second vehicle is unable to perform the at least one task of the one or more tasks, the at least one of server(s) 915, platform(s) 925, at least one manned vehicle 935, at least one unmanned 940, and/or computing system(s) 950 might identify at least one third vehicle of the one or more second vehicles that is capable of performing the at least one task of the one or more tasks and within a predetermined geographic range, might generate one or more second control instructions, and might send the one or more second control instructions to the at least one third vehicle, the one or more second control instructions causing each of the at least one third vehicle to perform the one or more first actions.

In alternative embodiments, the at least one of server(s) 915, platform(s) 925, at least one manned vehicle 935, at least one unmanned 940, and/or computing system(s) 950 might receive at least one first data from each of a plurality of vehicles of a self-organizing mobile network ("SOMNET") of vehicles, the at least one first data comprising status data regarding each vehicle of the plurality of vehicles; receive at least one second data from each of a plurality of platforms, the at least one second data comprising status data regarding each platform of the plurality of platforms; analyze the at least one first data to determine a status of each of the plurality of vehicles; and analyze the at least one second data to determine a status of each of the plurality of platforms. Based at least in part on the analyzed at least one first data and the analyzed at least one second data, the at least one of server(s) 915, platform(s) 925, at least one manned vehicle 935, at least one unmanned 940, and/or computing system(s) 950 might generate at least one of one or more first control instructions to at least one first vehicle of the plurality of vehicles or one or more second control instructions to at least one first platform of the plurality of platforms, the one or more first control instructions causing each of the at least one first vehicle to perform one or more first actions, and the one or more second control instructions causing each of the at least one first platform to perform one or more second actions.

These and other functions of the system 900 (and its components) are described in greater detail above with respect to FIGS. 1-7.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, one or more requests for one of a plurality of vehicles to perform one or more tasks;
   receiving, with the computing system, at least one first data from at least one first vehicle of the plurality of vehicles, the at least one first data comprising data regarding one or more second vehicles of the plurality of vehicles of a self-organizing mobile network ("SOMNET") of vehicles, wherein the at least one first vehicle receives beacon data from each of at least one second vehicle of the one or more second vehicles, wherein the data regarding the one or more second vehicles comprises the beacon data from each of the at least one second vehicle, wherein the beacon data from each of the at least one second vehicle comprises at least one of signal strength of the beacon data, communication transmit power level, or configuration parameters;

analyzing, with the computing system, the at least one first data to determine a status of at least one second vehicle of the one or more second vehicles; and in response to receiving the one or more requests and based at least in part on a determination that the at least one second vehicle is capable of performing at least one task of the one or more tasks, generating, with the computing system, one or more first control instructions and sending, with the computing system, the one or more first control instructions to the at least one second vehicle, the one or more first control instructions causing each of the at least one second vehicle to perform one or more first actions.

2. The method of claim 1, further comprising:

in response to receiving the one or more requests and based at least in part on a determination that the at least one second vehicle is unable to perform the at least one task of the one or more tasks, identifying, with the computing system, at least one third vehicle of the one or more second vehicles that is capable of performing the at least one task of the one or more tasks and that is within a predetermined geographic range, generating, with the computing system, one or more second control instructions, and sending, with the computing system, the one or more second control instructions to the at least one third vehicle, the one or more second control instructions causing each of the at least one third vehicle to perform the one or more first actions.

3. The method of claim 1, wherein the one or more second vehicles comprise the first vehicle.

4. The method of claim 1, wherein the computing system comprises at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system.

5. The method of claim 1, wherein each of the plurality of vehicles comprises one of a manned vehicle or an unmanned vehicle, wherein each manned vehicle comprises one of a car, a motorcycle, an all-terrain vehicle, a truck, a van, a semi-trailer truck, an aircraft, a subterranean vehicle, an amphibious vehicle, or a water craft, wherein each unmanned vehicle comprises one of an aerial drone, a land-based drone, a water-based drone, a subterranean drone, an amphibious drone, a robot, or an autonomous vehicle.

6. The method of claim 1, wherein at least one vehicle of the plurality of vehicles comprises an inductive charging system that charges via inductive power transfer from one or more charging pads in a corresponding charging platform.

7. The method of claim 1, wherein the determined status of the at least one second vehicle comprises one of current battery charge level, remaining battery charge level, current geographic location, one or more currently plotted destinations, one or more currently plotted courses, proximity to one or more charging platforms, proximity to one or more communications platforms, proximity to one or more nearby vehicles, communications status with one or more nearby vehicles, new device status within the SOMNET, registration status within the SOMNET, availability to perform at least one of the one or more tasks, status of current task, status of one or more onboard tools, device failure status, disabled device status, or out-of-range device status.

8. The method of claim 1, wherein the beacon data from each of the at least one second vehicle comprises at least one of a unique identifier assigned to a particular one of the at least one second vehicle, current battery level of the at least one second vehicle, remaining battery level of the at least one second vehicle, geographic location information of the particular one of the at least one second vehicle, or relative location information of the particular one of the at least one second vehicle with respect to other vehicles.

9. The method of claim 1, wherein the one or more first actions comprise at least one of establishing wireless network communications between a built-in mobile wireless base station and at least one wireless network node of a telecommunications network to augment wireless network functionality, establishing wireless network communications between a built-in mobile wireless base station and at least one wireless network node of a telecommunications network to extend wireless network functionality, monitoring for vehicular accidents, monitoring for criminal activities, monitoring for man-made disasters, monitoring for natural disasters, tracking real-time traffic patterns, tracking one or more weather conditions, recovering one or more lost vehicles, recovering one or more damaged vehicles, delivering one or more packages, tracking one or more packages being delivered, or repairing one or more telecommunications equipment.

10. The method of claim 1, wherein the one or more second vehicles each comprises at least one of a vehicle or a drone, wherein each of the one or more second vehicles comprises a mobile wireless base station, wherein the method further comprises:

deploying, with the computing system, the one or more second vehicles to at least one geographic area to extend a wireless range of a telecommunications network; and establishing, with the computing system, wireless network communications between the mobile wireless base station and at least one wireless network node of the telecommunications network.

11. The method of claim 1, wherein the one or more second vehicles each comprises at least one of a vehicle or a drone, wherein each of the one or more second vehicles comprises one or more weather sensors comprising at least one of one or more pressure sensors, one or more temperature sensors, one or more motion sensors, one or more solar light sensors, one or more ambient light sensors, one or more infra-red sensors, one or more ultra-violet sensors, one or more sound sensors, one or more seismic sensors, one or more air quality sensors, one or more moisture sensors, one or more wind sensors, or one or more particulate sensors, wherein the method further comprises:

tracking, with the one or more weather sensors, weather conditions in one or more geographic areas;

receiving, with the computing system, data from the one or more weather sensors tracking the weather conditions in the one or more geographic areas; and sending, with the computing system, one or more messages to at least one of one or more user devices associated with customers in the one or more geographic areas, one or more law enforcement agencies, one or more emergency response agencies, or one or more federal agencies, based at least in part on the received data from the one or more weather sensors.

12. The method of claim 1, wherein the one or more second vehicles each comprises at least one of a vehicle or a drone, wherein each of the one or more second vehicles comprises at least one of one or more cameras or one or more microphones, wherein the method further comprises:

monitoring, with the at least one of one or more cameras or one or more microphones, at least one of one or more vehicular accidents, one or more criminal activities, one or more man-made disasters, or one or more natural disasters;

receiving, with the computing system, at least one of video or audio content from the monitored at least one of one or more vehicular accidents, one or more criminal activities, one or more man-made disasters, or one or more natural disasters; and sending, with the computing system, one or more messages to at least one of one or more law enforcement agencies, one or more emergency response agencies, one or more towing service companies, or one or more federal agencies, based at least in part on the received at least one video or audio content.

13. The method of claim 1, wherein the one or more second vehicles each comprises at least one of a vehicle or a drone, wherein the method further comprises:

determining, with the computing system and based at least in part on the status of the at least one second vehicle of the one or more second vehicles, whether at least one fourth vehicle of the one or more second vehicles is at least one of disabled, damaged, or inoperable;

determining, with the computing system, a location of the at least one fourth vehicle that has been determined to be at least one of disabled, damaged, or inoperable;

deploying, with the computing system, at least one fifth vehicle of the one or more second vehicles to the location of the at least one fourth vehicle that has been determined to be at least one of disabled, damaged, or inoperable;

determining, with the computing system, whether the at least one fourth vehicle is capable of being repaired on-site;

based on a determination that the at least one fourth vehicle is capable of being repaired on-site, repairing, using one or more repair tools of the at least one fifth vehicle, the at least one fourth vehicle; and based on a determination that the at least one fourth vehicle is incapable of being repaired on-site, retrieving, using one or more retrieval tools of the at least one fifth vehicle, the at least one fourth vehicle and transporting the at least one fourth vehicle to a repair facility.

14. The method of claim 1, wherein the one or more second vehicles each comprises at least one of a vehicle or a drone, wherein the method further comprises:

retrieving, using one or more package delivery tools of the one or more second vehicles, one or more packages;

deploying, with the computing system, the one or more second vehicles to one or more customer locations with the retrieved one or more packages, the one or more customer locations comprising at least one of one or more customer premises, one or more parked customer vehicles, one or more moving customer vehicles, one or more current locations of a user device associated with a recipient of at least one of the one or more packages, one or more anticipated locations of a user device associated with a recipient of at least one of the one or more packages, or one or more designated delivery locations; and delivering, with the one or more second vehicles, each of the retrieved one or more packages to a corresponding one of the one or more customer locations.

15. The method of claim 1, wherein the one or more second vehicles each comprises at least one of a vehicle or a drone, wherein each of the one or more second vehicles comprises at least one of one or more cameras or one or more microphones, wherein the method further comprises:

monitoring, with the at least one of one or more cameras or one or more microphones, at least one package being delivered to one or more customer locations, the one or more customer locations comprising at least one of one or more customer premises, one or more parked customer vehicles, one or more moving customer vehicles, or one or more designated delivery locations;

receiving, with the computing system, at least one of video or audio content from the monitored at least one package being delivered to the one or more customer locations; and sending, with the computing system, one or more messages to at least one of one or more user devices associated with customers who are located at the one or more customer locations, one or more devices associated with a service provider deploying the one or more second vehicles, one or more devices associated with a delivery company delivering the at least one package, or one or more devices associated with one or more merchants who sold the at least one package to the customers.

16. The method of claim 1, wherein the one or more second vehicles each comprises at least one of a vehicle or a drone, wherein the method further comprises:

determining, with the computing system, whether one or more telecommunications equipment within a geographic area are at least one of disabled, damaged, or inoperable;

determining, with the computing system, a location of the one or more telecommunications equipment that have been determined to be at least one of disabled, damaged, or inoperable;

deploying, with the computing system, at least one sixth vehicle of the one or more second vehicles to the location of each of the one or more telecommunications equipment that have been determined to be at least one of disabled, damaged, or inoperable;

determining, with the computing system, whether the one or more telecommunications equipment are capable of being repaired on-site;

based on a determination that at least one of the one or more telecommunications equipment are capable of being repaired on-site, repairing, using one or more repair tools of the at least one sixth vehicle, the at least one of the one or more telecommunications equipment that are capable of being repaired on-site; and based on a determination that at least one of the one or more telecommunications equipment are incapable of being repaired on-site, retrieving, using one or more retrieval tools of the at least one sixth vehicle, the at least one of the one or more telecommunications equipment that are incapable of being repaired on-site and transporting the at least one of the one or more telecommunications equipment to a repair facility.

17. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
- receive one or more requests for one of a plurality of vehicles to perform one or more tasks;
- receive at least one first data from at least one first vehicle of the plurality of vehicles, the at least one first data comprising data regarding one or more second vehicles of the plurality of vehicles of a self-organizing mobile network ("SOMNET") of vehicles, wherein the at least one first vehicle receives beacon data from each of at least one second vehicle of the one or more second vehicles, wherein the data regarding the one or more second vehicles comprises the beacon data from each of the at least one second vehicle, wherein the beacon data from each of the at least one second vehicle comprises at least one of signal strength of the beacon data, communication transmit power level, or configuration parameters;
- analyze the at least one first data to determine a status of at least one second vehicle of the one or more second vehicles; and
- in response to receiving the one or more requests and based at least in part on a determination that the at least one second vehicle is capable of performing at least one task of the one or more tasks, generate one or more first control instructions and send the one or more first control instructions to the at least one second vehicle, the one or more first control instructions causing each of the at least one second vehicle to perform one or more first actions.

18. The apparatus of claim 17, wherein the apparatus comprises at least one of one or more vehicle processors disposed in one of the plurality of vehicles, one or more processors disposed in a user device associated with an operator of a service provider, a self-organizing network ("SON") server, a service provider server, a gateway device, a computing node, a server computer, a distributed computing system, a distributed computing system that integrates computing resources from two or more vehicles, or a cloud computing system.

19. The apparatus of claim 17, wherein each of the plurality of vehicles comprises one of a manned vehicle or an unmanned vehicle, wherein each manned vehicle comprises one of a car, a motorcycle, an all-terrain vehicle, a truck, a van, a semi-trailer truck, an aircraft, a subterranean vehicle, an amphibious vehicle, or a water craft, wherein each unmanned vehicle comprises one of an aerial drone, a land-based drone, a water-based drone, a subterranean drone, an amphibious drone, a robot, or an autonomous vehicle.

20. A system, comprising:
a computing system, comprising:
- at least one first processor; and
- a first non-transitory computer readable medium communicatively coupled to the at least one first processor, the first non-transitory computer readable medium having stored thereon computer software comprising a first set of instructions that, when executed by the at least one first processor, causes the computing system to:
  - receive one or more requests for one of a plurality of vehicles to perform one or more tasks;
  - receive at least one first data from at least one first vehicle of the plurality of vehicles, the at least one first data comprising data regarding one or more second vehicles of the plurality of vehicles of a self-organizing mobile network ("SOMNET") of wherein the at least one first vehicle receives beacon data from each of at least one second vehicle of the one or more second vehicles, wherein the data regarding the one or more second vehicles comprises the beacon data from each of the at least one second vehicle, wherein the beacon data from each of the at least one second vehicle comprises at least one of signal strength of the beacon data, communication transmit power level, or configuration parameters;
  - analyze the at least one first data to determine a status of at least one second vehicle of the one or more second vehicles; and
  - in response to receiving the one or more requests and based at least in part on a determination that the at least one second vehicle is capable of performing at least one task of the one or more tasks, generate one or more first control instructions and send the one or more first control instructions to the at least one second vehicle, the one or more first control instructions causing each of the at least one second vehicle to perform one or more first actions the at least one second vehicle comprising:
- a propulsion system;
- at least one second processor; and
- a second non-transitory computer readable medium communicatively coupled to the at least one second processor, the second non-transitory computer readable medium having stored thereon computer software comprising a second set of instructions that, when executed by the at least one second processor, causes the at least one second vehicle to:
  - receive one of the one or more first control instructions or the one or more second control instructions; and
  - perform the one or more first actions, based at least in part on the received one of the one or more first control instructions.

* * * * *